(12) United States Patent
Guo et al.

(10) Patent No.: US 12,231,900 B2
(45) Date of Patent: Feb. 18, 2025

(54) COMMUNICATION METHOD AND APPARATUS

(71) Applicant: HUAWEI TECHNOLOGIES CO., LTD., Guangdong (CN)

(72) Inventors: Longhua Guo, Shanghai (CN); He Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 386 days.

(21) Appl. No.: 17/675,784

(22) Filed: Feb. 18, 2022

(65) Prior Publication Data

US 2022/0174497 A1 Jun. 2, 2022

Related U.S. Application Data

(63) Continuation of application No. PCT/CN2019/101249, filed on Aug. 18, 2019.

(51) Int. Cl.
*H04W 12/72* (2021.01)
*H04W 8/18* (2009.01)

(52) U.S. Cl.
CPC ........... *H04W 12/72* (2021.01); *H04W 8/183* (2013.01)

(58) Field of Classification Search
CPC ..... H04W 12/72; H04W 8/183; H04W 12/06; H04W 12/082; H04W 12/126; H04W 8/18; H04W 60/04
See application file for complete search history.

(56) References Cited

U.S. PATENT DOCUMENTS

| 2014/0101466 | A1 | 4/2014 | Itakura | |
|---|---|---|---|---|
| 2015/0207917 | A1 | 7/2015 | Yang et al. | |
| 2019/0053054 | A1* | 2/2019 | Seshadri | ............... H04W 60/00 |
| 2020/0077268 | A1* | 3/2020 | Seshadri | ............... H04W 12/08 |

FOREIGN PATENT DOCUMENTS

| CN | 101330387 A | 12/2008 |
|---|---|---|
| CN | 101521886 A | 9/2009 |
| CN | 101527909 A | 9/2009 |

(Continued)

OTHER PUBLICATIONS

Office Action in Chinese Appln. No. 201980099291.5, dated Jan. 18, 2023, 12 pages.

(Continued)

*Primary Examiner* — Baotran N To
(74) *Attorney, Agent, or Firm* — Fish & Richardson P.C.

(57) ABSTRACT

Embodiments of this application provide example communication methods and apparatuses. One example communication method is applied to a communications device, where a subscriber identification module (SIM) card is installed in the communications device, and where the example communication method includes determining, by the communications device, that the SIM card is removed. The communications device can then send alarm information to a network device, where the alarm information indicates that the SIM card in the communications device is removed, and where security protection is performed on the alarm information based on security context stored in the communications device. The communications device can then delete the security context.

20 Claims, 22 Drawing Sheets

(56) References Cited

FOREIGN PATENT DOCUMENTS

| | | | |
|---|---|---|---|
| CN | 101600205 | A | 12/2009 |
| CN | 101686572 | A | 3/2010 |
| CN | 102711108 | A | 10/2012 |
| CN | 103108327 | A | 5/2013 |
| CN | 103338431 | A | 10/2013 |
| CN | 104244227 | A | 12/2014 |
| CN | 105101194 | A | 11/2015 |
| CN | 107979692 | A | 5/2018 |
| CN | 109104720 | A | 12/2018 |
| EP | 1887816 | A1 | 2/2008 |
| WO | 2019032236 | A1 | 2/2019 |

OTHER PUBLICATIONS

Anonymous, "Method and System for Blocking a Mobile Phone Based on Detecting Removal of a Subscriber dentification Module (SIM) Card," IP.com PriorArtDatabase, IP.com No. IPCOM000223170D, Nov. 6, 2012, 4 pages.

Extended European Search Report issued in European Application No. 19942412.8 on Jul. 28, 2022, 9 pages.

3GPP TS 23.501 V16.1.0 (Jun. 2019), "3rd Generation Partnership Project; Technical Specification Group Services and System Aspects; System Architecture for the 5G System; Stage 2 (Release 16)," Jun. 2019, 367 pages.

3GPP TS 33.501 V15.5.0 (Jun. 2019), "3rd Generation Partnership Project; Technical Specification Group Services and System Aspects; Security architecture and procedures for 5G system(Release 15)," Jun. 2019, 190 pages.

3GPP TS 38.401 V15.6.0 (Jul. 2019), "3rd Generation Partnership Project; Technical Specification Group Radio Access Network; NG-RAN; Architecture description(Release 15)," Jul. 2019, 46 pages.

PCT International Search Report and Written Opinion issued in International Application No. PCT/CN2019/101249 on May 18, 2020, 16 pages (with English translation).

* cited by examiner

COMMUNICATION METHOD AND APPARATUS

CROSS-REFERENCE TO RELATED APPLICATIONS

This application is a continuation of International Application No. PCT/CN2019/101249, filed on Aug. 18, 2019, the disclosure of which is hereby incorporated by reference in its entirety.

TECHNICAL FIELD

This application relates to the field of communications technologies, and in particular, to a communication method and apparatus.

BACKGROUND

In a mobile communications system, a subscriber identification module (subscriber identification module, SIM) card may be used as an identifier of a network identity of a mobile user. The SIM card is mainly used to store user data and complete user identity authentication. Currently, removal of a SIM card in a communications device may pose a security risk to a communications network. For example, if an attacker removes a SIM card in a device 1 from the device 1, and inserts the SIM card into a device 2, the device 2 may access the communications network by using the SIM card of the device 1, and a network side mistakenly considers the device 2 as the device 1. In this case, the device 2 may perform a plurality of man-in-the-middle attacks. Consequently, there is a great potential security risk in the communications network. To resolve this problem, a solution is urgently needed in the industry.

SUMMARY

This application provides a communication method and apparatus, to lower a security risk posed by removal of a SIM card from a communications device, and improve security of a communications network.

Part 1

According to a first aspect, a communications system is provided, and includes a communications device and a network device. A subscriber identification module SIM card is installed in the communications device. The communications device is configured to: determine that the SIM card is removed; send alarm information to the network device, where the alarm information is used to indicate that the SIM card in the communications device is removed, and security protection is performed on the alarm information based on security context stored in the communications device; and delete the security context. The network device is configured to: receive the alarm information; and store the alarm information.

Based on the foregoing technical solution, after the communications device determines that the SIM card is removed, the communications device sends the alarm information to a network side. Security protection is performed on the alarm information based on the security context, so that the network side trusts the alarm information. In this way, the network side can learn, based on the alarm information, that the SIM card is removed from the communications device, and then the network side can take a targeted measure, to avoid a potential security risk posed by removal of the SIM card.

In a possible design, that the communications device is configured to determine that the SIM card is removed includes: determining that a connection to the SIM card is interrupted; or determining that information cannot be read from the SIM card.

In a possible design, the network device is a mobility management network element; that the communications device is configured to send alarm information to the network device includes: sending, to the mobility management network element, NAS signaling on which non-access stratum (non-access stratum, NAS) security protection is performed based on the security context, where the NAS signaling includes the alarm information; and that the network device is configured to receive the alarm information includes: receiving the NAS signaling.

In a possible design, that the communications device is configured to delete the security context includes: receiving a security-protected NAS acknowledgment message sent by the mobility management network element; and deleting the security context after performing security deprotection on the NAS acknowledgment message by using the security context.

In a possible design, the network device is an access network device; that the communications device is configured to send alarm information to the network device includes: sending, to the access network device, AS signaling on which access stratum (access stratum, AS) security protection is performed based on the security context, where the AS signaling includes the alarm information; and that the network device is configured to receive the alarm information includes: receiving the AS signaling.

In a possible design, that the communications device is configured to delete the security context includes: receiving a security-protected AS acknowledgment message sent by the access network device; and deleting the security context after performing security deprotection on the AS acknowledgment message by using the security context.

In a possible design, that the communications device is configured to delete the security context includes: deleting the security context after a configured timer expires. The timer starts timing after the communications device sends the alarm information, or the timer starts timing after the communications device determines that the SIM card is removed.

According to a second aspect, a communication method is provided. The method is applied to a communications device, and a SIM card is installed in the communications device. The communication method includes: The communications device determines that the SIM card is removed; the communications device sends alarm information to a network device, where the alarm information is used to indicate that the SIM card in the communications device is removed, and security protection is performed on the alarm information based on security context stored in the communications device; and the communications device deletes the security context.

Based on the foregoing technical solution, after the communications device determines that the SIM card is removed, the communications device sends the alarm information. Security protection is performed on the alarm information based on the security context, so that a network side trusts the alarm information. In this way, the network side can learn, based on the alarm information, that the SIM card is removed from the communications device, and then the network side can take a targeted measure, to avoid a potential security risk posed by removal of the SIM card.

In a possible design, that the communications device determines that the SIM card is removed includes: The communications device determines that a connection to the SIM card is interrupted; or the communications device determines that information cannot be read from the SIM card.

In a possible design, when the network device is a mobility management network element, that the communications device sends alarm information to a network device includes: The communications device sends, to the mobility management network element, NAS signaling on which NAS security protection is performed based on the security context. The NAS signaling includes the alarm information.

In a possible design, that the communications device deletes the security context includes: The communications device receives a security-protected NAS acknowledgment message sent by the mobility management network element; and the communications device deletes the security context after performing security deprotection on the NAS acknowledgment message by using the security context.

In a possible design, when the network device is an access network device, that the communications device sends alarm information to a network device includes: The communications device sends, to the access network device, AS signaling on which AS security protection is performed based on the security context. The AS signaling includes the alarm information.

In a possible design, that the communications device deletes the security context includes: The communications device receives a security-protected AS acknowledgment message sent by the access network device; and the communications device deletes the security context after performing security deprotection on the AS acknowledgment message by using the security context.

In a possible design, that the communications device deletes the security context includes: The communications device deletes the security context after a configured timer expires. The timer starts timing after the communications device sends the alarm information, or the timer starts timing after the communications device determines that the SIM card is removed.

According to a third aspect, a communications apparatus is provided. A SIM card is installed in the communications apparatus, and the communications apparatus includes a communications module and a processing module. The processing module is configured to determine that the SIM card is removed. The communications module is configured to send alarm information to a network device. The alarm information is used to indicate that the SIM card in the communications apparatus is removed, and security protection is performed on the alarm information based on security context stored in the communications apparatus. The processing module is further configured to delete the security context.

In a possible design, that the processing module is configured to determine that the SIM card is removed includes: determining that a connection to the SIM card is interrupted; or determining that information cannot be read from the SIM card.

In a possible design, that the communications module is configured to send alarm information to a network device includes: sending, to a mobility management network element, NAS signaling on which NAS security protection is performed based on the security context. The NAS signaling includes the alarm information.

In a possible design, the communications module is further configured to receive a security-protected NAS acknowledgment message sent by the mobility management network element; and the processing module is specifically configured to delete the security context after performing security deprotection on the NAS acknowledgment message by using the security context.

In a possible design, that the communications module is configured to send alarm information to a network device includes: sending, to an access network device, AS signaling on which AS security protection is performed based on the security context. The AS signaling includes the alarm information.

In a possible design, the communications module is further configured to receive a security-protected AS acknowledgment message sent by the access network device; and the processing module is specifically configured to delete the security context after performing security deprotection on the AS acknowledgment message by using the security context.

In a possible design, the processing module is specifically configured to delete the security context after a configured timer expires. The timer starts timing after the communications apparatus sends the alarm information, or the timer starts timing after the communications apparatus determines that the SIM card is removed.

According to a fourth aspect, an apparatus is provided, and includes a processor. The processor is coupled to a memory. The memory stores instructions. When the processor executes the instructions, the apparatus is enabled to implement the communication method in any design of the second aspect. Optionally, the apparatus further includes a communications interface, and the communications interface is used by the apparatus to communicate with another device.

According to a fifth aspect, a computer-readable storage medium is provided. The computer-readable storage medium stores instructions. When the instructions are run on a computer, the computer is enabled to perform the communication method in any design of the second aspect.

According to a sixth aspect, a computer program product that includes instructions is provided. When the computer program product is run on a computer, the computer is enabled to perform the communication method in any design of the second aspect.

According to a seventh aspect, a chip is provided. The chip includes a processor. When the processor executes instructions, the processor is configured to perform the communication method in any design of the second aspect. The instructions may be from a memory inside the chip, or may be from a memory outside the chip. Optionally, the chip further includes an input/output circuit that may be used as a communications interface.

Part 2

According to an eighth aspect, a communications system is provided, and includes a first network element and a second network element. The second network element is configured to: receive an authentication request for a mobile user, where the authentication request includes a user identifier of the mobile user; determine that a communications device used by the mobile user needs to be authenticated; and send a device authentication indication to the first network element, where the device authentication indication is used to indicate that device authentication needs to be performed on the communications device, and the device authentication is used to determine whether the communications device matches a SIM card corresponding to the mobile user. The first network element is configured to:

receive the device authentication indication; and perform device authentication on the communications device.

Based on the foregoing technical solution, after the communications device initiates a registration procedure of the mobile user corresponding to the SIM card, the second network element determines, based on the received authentication request for the mobile user, whether device authentication needs to be performed on the communications device used by the mobile user. In addition, when device authentication needs to be performed on the communications device, the second network element sends the device authentication indication to the first network element, so that the first network element performs device authentication on the communications devices, to verify whether the communications device matches the SIM card inserted into the communications device, so as to prevent an unauthorized device from accessing a communications network by using a SIM card of an authorized device.

In a possible design, the communications device used by the mobile user needs to be authenticated in one of the following cases: There is alarm information in subscription data of the mobile user, where the alarm information is used to indicate that the SIM card corresponding to the mobile user is removed; the mobile user is bound to a first-type device, where the first-type device is a communications device that is in a binding relationship with a SIM card; the SIM card is a physical card; and internet protocol security (internet protocol security, IPsec) configuration information corresponding to the mobile user is used to indicate that an IPsec function is not enabled or no IPsec authentication credential is stored.

In a possible design, the second network element is further configured to: obtain corresponding device authentication information based on the user identifier of the mobile user, and send the device authentication information to the first network element, where the device authentication information is a device authentication credential, or the device authentication information is an authentication parameter generated based on a device authentication credential; and the first network element is further configured to receive the device authentication information.

In a possible design, the first network element is further configured to send device authentication success information to the second network element, where the device authentication success information is used to indicate that device authentication performed on the communications device succeeds; and the second network element is further configured to: receive the device authentication success information; and delete the alarm information from the subscription data of the mobile user.

In a possible design, that the first network element is configured to perform device authentication on the communications device includes: performing device authentication on the communications device in a registration procedure; or performing device authentication on the communications device after a registration procedure ends.

In a possible design, the first network element is a mobility management network element; and that the first network element is configured to perform device authentication on the communications device includes: sending a downlink NAS message to the communications device, where the downlink NAS message includes a device authentication request message, and the device authentication request message is used to request the communications device to perform device authentication; receiving an uplink NAS message from the communications device, where the uplink NAS message includes device authentication information stored in the communications device; verifying whether the device authentication information stored in the communications device is consistent with the device authentication information corresponding to the user identifier; and when the device authentication information stored in the communications device is inconsistent with the device authentication information corresponding to the user identifier, determining that device authentication fails; or when the device authentication information stored in the communications device is consistent with the device authentication information corresponding to the user identifier, determining that device authentication succeeds.

In a possible design, the first network element is a mobility management network element; and that the first network element is configured to perform device authentication on the communications device includes: sending a downlink NAS message to the communications device, where the downlink NAS message includes a device authentication request message, and the device authentication request message is used to request the communications device to perform device authentication; receiving an uplink NAS message from the communications device, where the uplink NAS message includes device authentication information stored in the communications device; sending the device authentication information stored in the communications device to an authentication server; and receiving device authentication success information or device authentication failure information sent by the authentication server.

In a possible design, security protection is performed on the downlink NAS message based on security context, and security protection is performed on the uplink NAS message based on the security context.

In a possible design, the downlink NAS message is a NAS security mode command (security mode command, SMC) message, and the uplink NAS message is a NAS security mode complete (security mode complete, SMP) message.

In a possible design, the first network element is further configured to send a registration failure message to the communications device when device authentication fails. The registration failure message includes a cause value of failure of device authentication.

In a possible design, the first network element is further configured to send a deregistration request message to the communications device when device authentication fails. The deregistration request message includes a cause value of failure of device authentication.

In a possible design, the first network element is an access network device; and that the first network element is configured to perform device authentication on the communications device includes: sending a downlink AS message to the communications device, where the downlink AS message includes a device authentication request message, and the device authentication request message is used to request the communications device to perform device authentication; receiving an uplink AS message from the communications device, where the uplink AS message includes device authentication information stored in the communications device; verifying whether the device authentication information stored in the communications device is consistent with the device authentication information corresponding to the user identifier; and when the device authentication information stored in the communications device is inconsistent with the device authentication information corresponding to the user identifier, determining that device authentication fails, or when the device authentication information stored in the communications device is consistent with the device authentication information corresponding to the user identifier, determining that device authentication succeeds.

In a possible design, the first network element is an access network device; and that the first network element is configured to perform device authentication on the communications device includes: sending a downlink AS message to the communications device, where the downlink AS message includes a device authentication request message, and the device authentication request message is used to request the communications device to perform device authentication; receiving an uplink AS message from the communications device, where the uplink AS message includes device authentication information stored in the communications device; sending the device authentication information stored in the communications device to an authentication server; and receiving device authentication success information or device authentication failure information sent by the authentication server.

In a possible design, security protection is performed on the downlink AS message based on security context, and security protection is performed on the uplink AS message based on the security context.

In a possible design, the downlink AS message is an AS SMC message, and the uplink AS message is an AS SMP message.

In a possible design, the first network element is further configured to send a device authentication failure message to a mobility management network element when device authentication fails. The device authentication failure message is used to indicate the mobility management network element to reject the communications device from accessing a network.

In a possible design, the device authentication includes IPsec authentication.

According to a ninth aspect, a communication method is provided. The method is applied to a communications device, and a SIM card is installed in the communications device. The method includes: The communications device performs device authentication with a first network element after successfully completing primary authentication by using a registration procedure, where the device authentication is used to determine whether the communications device matches the SIM card; and when the communications device does not match the SIM card, the communications device disconnects from a network.

Based on the foregoing technical solution, after the SIM card is inserted into the communications device, the communications device initiates a registration procedure of a mobile user corresponding to the SIM card. Then, the communications device performs device authentication with the first network element, to verify whether the communications device matches the SIM card inserted into the communications device. When the communications device matches the SIM card inserted into the communications device, the communications device may access the communications network. When the communications device does not match the SIM card inserted into the communications device, the communications device is forbidden by the first network element to access the communications network. Therefore, in the technical solution in this embodiment of this application, an unauthorized device can be prevented from accessing the communications network by using a SIM card of an authorized device, to ensure security of the communications network.

In a possible design, that the communications device performs device authentication with a first network element includes: The communications device performs device authentication with the first network element in the registration procedure; or the communications device performs device authentication with the first network element after the registration procedure ends.

In a possible design, the first network element is a mobility management network element; and that the communications device performs device authentication with a first network element after successfully completing primary authentication by using a registration procedure includes: The communications device receives a downlink NAS message sent by the mobility management network element, where the downlink NAS message includes a device authentication request message, and the device authentication request message is used to request the communications device to perform device authentication; and the communications device sends an uplink NAS message to the mobility management network element, where the uplink NAS message includes device authentication information stored in the communications device.

In a possible design, security protection is performed on the downlink NAS message based on security context, and security protection is performed on the uplink NAS message based on the security context.

In a possible design, the downlink NAS message is a NAS SMC message, and the uplink NAS message is a NAS SNIP message.

In a possible design, the first network element is an access network device; and that the communications device performs device authentication with a first network element after successfully completing primary authentication by using a registration procedure includes: The communications device receives a downlink AS message sent by the access network device, where the downlink AS message includes a device authentication request message, and the device authentication request message is used to request the communications device to perform device authentication; and the communications device sends an uplink AS message to the access network device, where the uplink AS message includes device authentication information stored in the communications device.

In a possible design, security protection is performed on the downlink AS message based on security context, and security protection is performed on the uplink AS message based on the security context.

In a possible design, the device authentication is internet protocol security IPsec authentication.

In a possible design, an authentication credential pre-stored in the communications device is used for the IPsec authentication.

In a possible design, the downlink AS message is an AS SMC message, and the uplink AS message is an AS SMP message.

In a possible design, before the communications device disconnects from the network, the method further includes: The communications device receives a registration failure message, where the registration failure message includes a cause value of failure of device authentication; or the communications device receives a deregistration request message, where the deregistration request message includes a cause value of failure of device authentication.

In a possible design, that the communications device disconnects from a network includes: The communications device deletes security context corresponding to the SIM card.

According to a tenth aspect, a communication method is provided, and includes: A first network element performs, after completing primary authentication on a mobile user in a registration procedure of the mobile user, device authentication on a communications device used by the mobile user, where the device authentication is used to determine whether the communications device matches a SIM card corresponding to the mobile user, the SIM card is installed in the communications device, and the SIM card includes identity information of the mobile user; and the first network element rejects the communications device from accessing a network when device authentication fails.

Based on the foregoing technical solution, after the SIM card is inserted into the communications device, the communications device initiates the registration procedure of the mobile user corresponding to the SIM card. Then, the communications device performs device authentication with the first network element, to verify whether the communications device matches the SIM card inserted into the communications device. When the communications device matches the SIM card inserted into the communications device, the communications device may access the communications network. When the communications device does not match the SIM card inserted into the communications device, the communications device is forbidden by the first network element to access the communications network. Therefore, in the technical solution in this embodiment of this application, an unauthorized device can be prevented from accessing the communications network by using a SIM card of an authorized device, to ensure security of the communications network.

In a possible design, that a first network element performs device authentication on a communications device used by the mobile user includes: The first network element receives a device authentication indication sent by a second network element, where the device authentication indication is used to indicate that device authentication needs to be performed on the communications device; and the first network element performs device authentication on the communications device based on the device authentication indication.

In a possible design, that a first network element performs, after completing primary authentication on a mobile user in a registration procedure of the mobile user, device authentication on a communications device used by the mobile user includes: The first network element performs device authentication on the communications device in the registration procedure; or the first network element performs device authentication on the communications device after the registration procedure ends.

In a possible design, the first network element is a mobility management network element; and that a first network element performs, after completing primary authentication on a mobile user in a registration procedure of the mobile user, device authentication on a communications device used by the mobile user includes: The first network element sends a downlink NAS message to the communications device, where the downlink NAS message includes a device authentication request message, and the device authentication request message is used to request the communications device to perform device authentication; the first network element receives an uplink NAS message from the communications device, where the uplink NAS message includes device authentication information stored in the communications device; the first network element verifies whether the device authentication information stored in the communications device is consistent with device authentication information corresponding to a user identifier; and when the device authentication information stored in the communications device is inconsistent with the device authentication information corresponding to the user identifier, the first network element determines that device authentication fails; or when the device authentication information stored in the communications device is consistent with the device authentication information corresponding to the user identifier, the first network element determines that device authentication succeeds.

In a possible design, the first network element is an access network device; and that a first network element performs, after completing primary authentication on a mobile user in a registration procedure of the mobile user, device authentication on a communications device used by the mobile user includes: The first network element sends a downlink NAS message to the communications device, where the downlink NAS message includes a device authentication request message, and the device authentication request message is used to request the communications device to perform device authentication; the first network element receives an uplink NAS message from the communications device, where the uplink NAS message includes device authentication information stored in the communications device; and the first network element sends the device authentication information stored in the communications device to an authentication server; and receives device authentication success information or device authentication failure information sent by the authentication server.

In a possible design, security protection is performed on the downlink NAS message based on security context, and security protection is performed on the uplink NAS message based on the security context.

In a possible design, the downlink NAS message is a NAS SMC message, and the uplink NAS message is a NAS SMP message.

In a possible design, that the first network element rejects the communications device from accessing a network when device authentication fails includes: The first network element sends a registration failure message to the communications device. The registration failure message includes a cause value of failure of device authentication.

In a possible design, that the first network element rejects the communications device from accessing a network when device authentication fails includes: The first network element sends a deregistration request message to the communications device. The deregistration request message includes a cause value of failure of device authentication.

In a possible design, the first network element is an access network device; and that a first network element performs, after completing primary authentication on a mobile user in a registration procedure of the mobile user, device authentication on a communications device used by the mobile user includes: The first network element sends a downlink AS message to the communications device, where the downlink AS message includes a device authentication request message, and the device authentication request message is used to request the communications device to perform device authentication; the first network element receives an uplink AS message from the communications device, where the uplink AS message includes device authentication information stored in the communications device; the first network element verifies whether the device authentication information stored in the communications device is consistent with device authentication information corresponding to a user identifier; and when the device authentication information stored in the communications device is inconsistent with the device authentication information corresponding to the user identifier, the first network element determines that device authentication fails; or when the device authentication information stored in the communications device is consistent with the device authentication information corresponding to the user identifier, the first network element determines that device authentication succeeds.

In a possible design, the first network element is an access network device; and that a first network element performs, after completing primary authentication on a mobile user in a registration procedure of the mobile user, device authentication on a communications device used by the mobile user includes: The first network element sends a downlink AS message to the communications device, where the downlink AS message includes a device authentication request message, and the device authentication request message is used to request the communications device to perform device authentication; the first network element receives an uplink AS message from the communications device, where the uplink AS message includes device authentication information stored in the communications device; the first network element sends the device authentication information stored in the communications device to an authentication server; and the first network element receives device authentication success information or device authentication failure information sent by the authentication server.

In a possible design, security protection is performed on the downlink AS message based on security context, and security protection is performed on the uplink AS message based on the security context.

In a possible design, that the first network element rejects the communications device from accessing a network when device authentication fails includes: The first network element sends a device authentication failure message to a mobility management network element. The device authentication failure message is used to indicate the mobility management network element to reject the communications device from accessing the network.

In a possible design, the device authentication includes internet protocol security IPsec authentication.

According to an eleventh aspect, a communication method is provided, and includes: A second network element determines, in a registration procedure of a mobile user, that device authentication needs to be performed on a communications device used by the mobile user, where the device authentication is used to determine whether the communications device matches a SIM card corresponding to the mobile user, the SIM card is installed in the communications device, and the SIM card includes identity information of the mobile user; and the second network element sends a device authentication indication to a first network element, where the device authentication indication is used to indicate that device authentication needs to be performed on the communications device.

Based on the foregoing technical solution, after the communications device initiates the registration procedure of the mobile user corresponding to the SIM card, the second network element determines, based on a received authentication request for the mobile user, whether device authentication needs to be performed on the communications device used by the mobile user. In addition, when device authentication needs to be performed on the communications device, the second network element sends the device authentication indication to the first network element, so that the first network element performs device authentication on the communications devices, to verify whether the communications device matches the SIM card inserted into the communications device, so as to prevent an unauthorized device from accessing a communications network by using a SIM card of an authorized device.

In a possible design, the method further includes. The second network element obtains device authentication information corresponding to the mobile user, where the device authentication information is a device authentication credential bound to the mobile user, or the device authentication information is an authentication parameter generated based on a device authentication credential; and the second network element sends the device authentication information to the first network element.

In a possible design, that a second network element determines that device authentication needs to be performed on a communications device includes: If there is alarm information in subscription data of the mobile user, the second network element determines that device authentication needs to be performed on the communications device. The alarm information is used to indicate that the SIM card corresponding to the mobile user is removed.

In a possible design, that a second network element determines that device authentication needs to be performed on a communications device includes: If the mobile user is bound to a first-type device, the second network element determines that device authentication needs to be performed on the communications device. The first-type device is a communications device that is in a binding relationship with a SIM card.

In a possible design, that a second network element determines that device authentication needs to be performed on a communications device includes: If the SIM card corresponding to the mobile user is a physical card, the second network element determines that device authentication needs to be performed on the communications device.

In a possible design, that a second network element determines that device authentication needs to be performed on a communications device includes: If internet protocol security IPsec configuration information corresponding to the mobile user is used to indicate that an IPsec function is not enabled or no IPsec authentication credential is stored, the second network element determines that device authentication needs to be performed on the communications device.

In a possible design, the method further includes: The second network element receives device authentication failure information sent by the first network element, where the device authentication failure information is used to indicate that device authentication performed on the communications device fails, and the second network element deletes the alarm information from the subscription data of the mobile user.

According to a twelfth aspect, a communications apparatus is provided. A SIM card is installed in the communications apparatus, and the communications apparatus includes a processing module and a communications module. The processing module is configured to perform device authentication with a first network element after successfully completing primary authentication by using a registration procedure. The device authentication is used to determine whether the communications apparatus matches the SIM card. The communications module is configured to disconnect from a network when the communications apparatus does not match the SIM card.

In a possible design, that the processing module is configured to perform device authentication with a first network element includes: performing device authentication with the first network element in the registration procedure; or performing device authentication with the first network element after the registration procedure ends.

In a possible design, the communications module is configured to: receive a downlink NAS message sent by a mobility management network element, where the downlink NAS message includes a device authentication request message, and the device authentication request message is used to request the communications apparatus to perform device authentication; and send an uplink NAS message to the mobility management network element, where the uplink NAS message includes device authentication information stored in the communications apparatus.

In a possible design, security protection is performed on the downlink NAS message based on security context, and security protection is performed on the uplink NAS message based on the security context.

In a possible design, the downlink NAS message is a NAS SMC message, and the uplink NAS message is a NAS SMP message.

In a possible design, the communications module is configured to: receive a downlink AS message sent by an access network device, where the downlink AS message includes a device authentication request message, and the device authentication request message is used to request the communications apparatus to perform device authentication; and send an uplink AS message to the access network device, where the uplink AS message includes device authentication information stored in the communications apparatus.

In a possible design, security protection is performed on the downlink AS message based on security context, and security protection is performed on the uplink AS message based on the security context.

In a possible design, the device authentication is IPsec authentication.

In a possible design, an authentication credential pre-stored in the communications apparatus is used for the IPsec authentication.

In a possible design, the downlink AS message is an AS SMC message, and the uplink AS message is an AS SMP message.

In a possible design, the communications module is further configured to: receive a registration failure message, where the registration failure message includes a cause value of failure of device authentication; or receive a deregistration request message, where the deregistration request message includes a cause value of failure of device authentication.

In a possible design, the processing module is configured to delete security context corresponding to the SIM card.

According to a thirteenth aspect, a communications apparatus is provided, and includes: a processing module, configured to: perform, after completing primary authentication on a mobile user in a registration procedure of the mobile user, device authentication on a communications device used by the mobile user, where the device authentication is used to determine whether the communications device matches a SIM card corresponding to the mobile user, the SIM card is installed in the communications device, and the SIM card includes identity information of the mobile user; and a communications module, configured to reject the communications device from accessing a network when device authentication fails.

In a possible design, the communications module is further configured to receive a device authentication indication sent by a second network element, where the device authentication indication is used to indicate that device authentication needs to be performed on the communications device; and the processing module is further configured to perform device authentication on the communications device based on the device authentication indication.

In a possible design, the processing module is configured to: perform device authentication on the communications device in the registration procedure; or perform device authentication on the communications device after the registration procedure ends.

In a possible design, the communications module is further configured to: send a downlink NAS message to the communications device, where the downlink NAS message includes a device authentication request message, and the device authentication request message is used to request the communications device to perform device authentication; and receive an uplink NAS message from the communications device, where the uplink NAS message includes device authentication information stored in the communications device; and the processing module is further configured to: verify whether the device authentication information stored in the communications device is consistent with device authentication information corresponding to a user identifier; and when the device authentication information stored in the communications device is inconsistent with the device authentication information corresponding to the user identifier, determine that device authentication fails; or when the device authentication information stored in the communications device is consistent with the device authentication information corresponding to the user identifier, determine that device authentication succeeds.

In a possible design, the communications module is further configured to: send a downlink NAS message to the communications device, where the downlink NAS message includes a device authentication request message, and the device authentication request message is used to request the communications device to perform device authentication; receive an uplink NAS message from the communications device, where the uplink NAS message includes device authentication information stored in the communications device; send the device authentication information stored in the communications device to an authentication server; and receive device authentication success information or device authentication failure information sent by the authentication server.

In a possible design, security protection is performed on the downlink NAS message based on security context, and security protection is performed on the uplink NAS message based on the security context.

In a possible design, the downlink NAS message is a NAS SMC message, and the uplink NAS message is a NAS SMP message.

In a possible design, the communications module is further configured to send a registration failure message to the communications device when device authentication fails. The registration failure message includes a cause value of failure of device authentication.

In a possible design, the communications module is further configured to send a deregistration request message to the communications device when device authentication fails. The deregistration request message includes a cause value of failure of device authentication.

In a possible design, the communications module is further configured to: send a downlink AS message to the communications device, where the downlink AS message includes a device authentication request message, and the device authentication request message is used to request the communications device to perform device authentication; and receive an uplink AS message from the communications device, where the uplink AS message includes device authentication information stored in the communications device; and the processing module is further configured to: verify whether the device authentication information stored in the communications device is consistent with device authentication information corresponding to a user identifier; and when the device authentication information stored in the communications device is inconsistent with the device authentication information corresponding to the user identifier, determine that device authentication fails; or when the device authentication information stored in the communications device is consistent with the device authentication information corresponding to the user identifier, determine that device authentication succeeds.

In a possible design, the communications module is further configured to: send a downlink AS message to the communications device, where the downlink AS message includes a device authentication request message, and the device authentication request message is used to request the communications device to perform device authentication; receive an uplink AS message from the communications device, where the uplink AS message includes device authentication information stored in the communications device; send the device authentication information stored in the communications device to an authentication server; and receive device authentication success information or device authentication failure information sent by the authentication server.

In a possible design, security protection is performed on the downlink AS message based on security context, and security protection is performed on the uplink AS message based on the security context.

In a possible design, the communications module is further configured to send a device authentication failure message to a mobility management network element when device authentication fails. The device authentication failure message is used to indicate the mobility management network element to reject the communications device from accessing the network.

In a possible design, the device authentication includes IPsec authentication.

According to a fourteenth aspect, a communications apparatus is provided, and includes: a processing module, configured to determine, in a registration procedure of a mobile user, that device authentication needs to be performed on a communications device used by the mobile user, where the device authentication is used to determine whether the communications device matches a SIM card corresponding to the mobile user, the SIM card is installed in the communications device, and the SIM card includes identity information of the mobile user; and a communications module, configured to send a device authentication indication to a first network element, where the device authentication indication is used to indicate that device authentication needs to be performed on the communications device.

In a possible design, the processing module is further configured to obtain device authentication information corresponding to the mobile user, where the device authentication information is a device authentication credential bound to the mobile user, or the device authentication information is an authentication parameter generated based on a device authentication credential; and the communications module is further configured to send the device authentication information to the first network element.

In a possible design, the processing module is configured to: if there is alarm information in subscription data of the mobile user, determine that device authentication needs to be performed on the communications device. The alarm information is used to indicate that the SIM card corresponding to the mobile user is removed.

In a possible design, the processing module is configured to: if the mobile user is bound to a first-type device, determine that device authentication needs to be performed on the communications device. The first-type device is a communications device that is in a binding relationship with a SIM card.

In a possible design, the processing module is configured to: if the SIM card corresponding to the mobile user is a physical card, determine that device authentication needs to be performed on the communications device.

In a possible design, the processing module is configured to: if internet protocol security IPsec configuration information corresponding to the mobile user is used to indicate that an IPsec function is not enabled or no IPsec authentication credential is stored, determine that device authentication needs to be performed on the communications device.

In a possible design, the communications module is further configured to receive device authentication failure information sent by the first network element, where the device authentication failure information is used to indicate that device authentication performed on the communications device fails; and the processing module is further configured to delete the alarm information from the subscription data of the mobile user.

According to a fifteenth aspect, an apparatus is provided, and includes a processor. The processor is coupled to a memory. The memory stores instructions. When the processor executes the instructions, the apparatus is enabled to implement the communication method in any design of the ninth aspect to the eleventh aspect. Optionally, the apparatus further includes a communications interface, and the communications interface is used by the apparatus to communicate with another device.

According to a sixteenth aspect, a computer-readable storage medium is provided. The computer-readable storage medium stores instructions. When the instructions are run on a computer, the computer is enabled to perform the communication method in any design of the ninth aspect to the eleventh aspect.

According to a seventeenth aspect, a computer program product that includes instructions is provided. When the computer program product is run on a computer, the computer is enabled to perform the communication method in any design of the ninth aspect to the eleventh aspect.

According to an eighteenth aspect, a chip is provided. The chip includes a processor. When the processor executes instructions, the processor is configured to perform the communication method in any design of the ninth aspect to the eleventh aspect. The instructions may be from a memory inside the chip, or may be from a memory outside the chip. Optionally, the chip further includes an input/output circuit that may be used as a communications interface.

DESCRIPTION OF EMBODIMENTS

Figure 1:
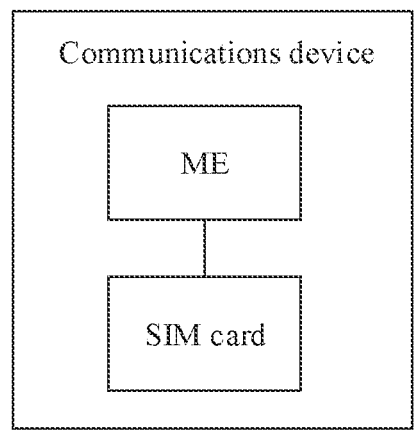
FIG. 1 is a schematic diagram of a structure of a communications device.

In descriptions of this application, unless otherwise specified, "/" means "or". For example, A/B may represent A or B. "And/or" in this specification describes only an association relationship for describing associated objects and represents that there may be three relationships. For example, A and/or B may represent the following three cases: Only A exists, both A and B exist, and only B exists. In addition, "at least one" means one or more, and "a plurality of" means two or more. Terms such as "first" and "second" do not limit a quantity and an execution sequence, and terms such as "first" and "second" do not indicate a definite difference.

It should be noted that, in this application, the word such as "example" or "for example" is used to represent giving an example, an illustration, or a description. Any embodiment or design scheme described as an "example" or "for example" in this application should not be explained as being more preferred or having more advantages than another embodiment or design scheme. Exactly, use of the word "example" or "for example" or the like is intended to present a relative concept in a specific manner.

In the descriptions of this application, the "indication" may include a direct indication and an indirect indication, or may include an explicit indication and an implicit indication. Information indicated by a piece of information (first indication information described below) is referred to as to-be-indicated information. In a specific implementation process, there are a plurality of manners of indicating the to-be-indicated information. For example, the to-be-indicated information may be directly indicated, where the to-be-indicated information, an index of the to-be-indicated information, or the like is indicated. For another example, the to-be-indicated information may be indirectly indicated by indicating other information, where there is an association relationship between the other information and the to-be-indicated information. For another example, only a part of the to-be-indicated information may be indicated, and the other part of the to-be-indicated information is already known or pre-agreed on. In addition, specific information may also be indicated by using a pre-agreed (for example, stipulated in a protocol) arrangement sequence of various pieces of information, to reduce indication overheads to some extent.

To facilitate understanding of technical solutions in this application, the following first briefly describes terms in this application.

1. Security Context

The security context refers to information that can be used to implement security protection (for example, encryption/decryption, and/or integrity protection/check) of data.

Encryption/decryption is performed to protect confidentiality of data in a transmission process (and therefore may also be referred to as confidentiality protection). Confidentiality means that real content cannot be directly seen. Encryption protection may usually be implemented by encrypting data by using a key and an encryption algorithm. For a specific encryption protection method, refer to related descriptions in section 8.2 in 3GPP TS 33.401 f50 or section 6.4.4 in 33.501 f50. Details are not described herein.

The integrity protection/check is used to determine whether content of a message is modified during transmission, and may also be used for identity authentication to determine a source of the message. The integrity check and protection require a message authentication code (message authentication code, MAC). For a specific method for the integrity check and protection, refer to related descriptions in section 8.1 in the 3rd generation partnership project (3rd generation partnership project, 3GPP) TS 33.401 f50 or section 6.4.3 in 33.501 f50. Details are not described herein.

The security context may include one or more of the following: a root key, an encryption key, an integrity protection key, a specific parameter (for example, a NAS count), a key set identifier (key set identifier, KSI), a security algorithm, a security indication (for example, an indication indicating whether encryption is enabled, an indication indicating whether integrity protection is enabled, an indication indicating a validity period of a key, or a key length), or the like.

The encryption key is a parameter input by a transmit end when the transmit end encrypts a plaintext based on an encryption algorithm to generate a ciphertext. If a symmetric encryption method is used, the encryption key and a decryption key are the same. A receive end may decrypt the ciphertext based on the same encryption algorithm and encryption key. In other words, the transmit end and the receive end may perform encryption and decryption based on a same key.

The integrity protection key is a parameter input by the transmit end when the transmit end performs integrity protection on a plaintext or a ciphertext based on an integrity protection algorithm. The receive end may perform, based on the same integrity protection algorithm and integrity protection key, integrity check on data on which integrity protection is performed.

The specific parameter (for example, the NAS count) is a parameter input by the transmit end when the transmit end performs anti-replay protection on a plaintext or a ciphertext based on an anti-replay protection algorithm. The receive end may perform, based on the same anti-replay protection algorithm, anti-replay check on data on which anti-replay protection is performed.

The security algorithm is an algorithm used to perform security protection on data, for example, an encryption algorithm, a decryption algorithm, or an integrity protection algorithm.

In the embodiments of this application, the security context may include NAS security context and AS security context.

2. User Identifier

In a 4G network, the user identifier may be an international mobile subscriber identity (international mobile subscriber identification number, IMSI).

In a 5G network, the user identifier may be a subscription permanent identifier (subscription permanent identifier), a subscription concealed identifier (subscription concealed identifier, SUCI), or a 5G globally unique temporary identity (5G globally unique temporary identity, 5G-GUTI).

It should be noted that the SUPI is used to represent a real identity of a user, and has a function similar to that of the IMSI in LTE.

The SUCI is generated after the SUPI is encrypted by using a public key. The SUCI is transmitted between a network device and a terminal, to prevent the SUPI transmitted in plaintext from being stolen by an attacker. It may be understood that the SUCI may be decrypted by using a private key paired with the public key, to obtain the SUCI.

3. Communications Device

FIG. 1 is a schematic diagram of a structure of a communications device according to an embodiment of this application. The communications device includes at least a universal integrated circuit card (universal integrated circuit card, UICC) and mobile equipment (mobile equipment, ME).

The UICC is mainly configured to store and calculate messages such as user information, an authentication key, and a payment mode. An important logic module in the UICC is a SIM card.

The ME is a device that sends, receives, and processes a message. The ME may be configured to store information other than a long-term key in security context. It should be noted that if the communications device is an integrated access backhaul (integrated access backhaul, IAB) node (node), the ME of the communications device is an MT of the IAB node.

It may be understood that for the communications device, after the SIM card is inserted into the ME, the ME may access a mobile communications network by reading user information in the SIM card, and establish security context with a network side.

4. SIM Card

In a mobile communications system, the SIM card may be used as an identifier of a network identity of a mobile user. The SIM card is used to store user data and complete user identity authentication. One SIM card corresponds to one mobile user. It should be noted that the SIM card may store a user identifier. For example, the user identifier may be an IMSI or an SUPI.

In the embodiments of this application, SIM cards may be classified into a first-type SIM card and a second-type SIM card.

The first-type SIM card is implemented in a form of a physical card, and includes but is not limited to a standard SIM card, a mini SIM card, a micro SIM card, and a nano SIM card. For example, the first-type SIM card may be a universal subscriber identity module (universal subscriber identity module, USIM) card.

The second-type SIM card may be implemented in a form of a chip, for example, an embedded subscriber identification module (embedded-SIM, eSIM) card. Alternatively, the second-type SIM card may be implemented in a form of software.

In the embodiments of this application, unless otherwise specified, the SIM card refers to the first-type SIM card.

5. Type of a Communications Device

In the embodiments of this application, communications devices are classified into a first-type device and a second-type device.

The first-type device is a device that is in a binding relationship with a SIM card. Only a preset SIM card that is in a binding relationship with the first-type device can be inserted into the first-type device. When a SIM card that is not in a binding relationship with the first-type device is used for the first-type device, the first-type device cannot access a network. For example, the first-type device may be an IAB node or an internet of things device, for example, a smart water meter. It may be understood that a SIM card that is not in a binding relationship with the first-type device should not be used for the first-type device, and a SIM card bound to the first-type device should not be used for another device. Therefore, if a network side finds that the SIM card bound to the first-type device does not match a communications device into which the SIM card is inserted, it indicates that the communications device is not a device bound to the SIM card, and therefore it indicates that the communications device is an unauthorized device. If the network side finds that the SIM card matches the communications device into which the SIM card is inserted, it indicates that the communications device is a device bound to the SIM card, and therefore it indicates that the communications device is an authorized device. Most first-type devices are in an unattended state. For example, the IAB node may be deployed in an open outdoor area. The SIM card inserted into the first-type device may be removed by an unauthorized person and inserted into an unauthorized device, resulting in a billing dispute or another security problem.

The second-type device is a device that is not in a binding relationship with a SIM card. For example, the second-type device may be a common terminal such as a mobile phone. It should be noted that a SIM card in the second-type device may be replaced without posing a security risk to the communications network.

For example, a type of a communications device is configured before the communications device is delivered. Alternatively, when a communications device accesses the communications network for the first time, the network side configures a type of the communications device.

6. Registration Procedure

The registration procedure is used to establish a connection between a communications device and a network side, so that the communications device can access a network. It may be understood that after a new SIM card is inserted into the communications device, the communications device may initiate a registration procedure to access the network.

Figure 2A:
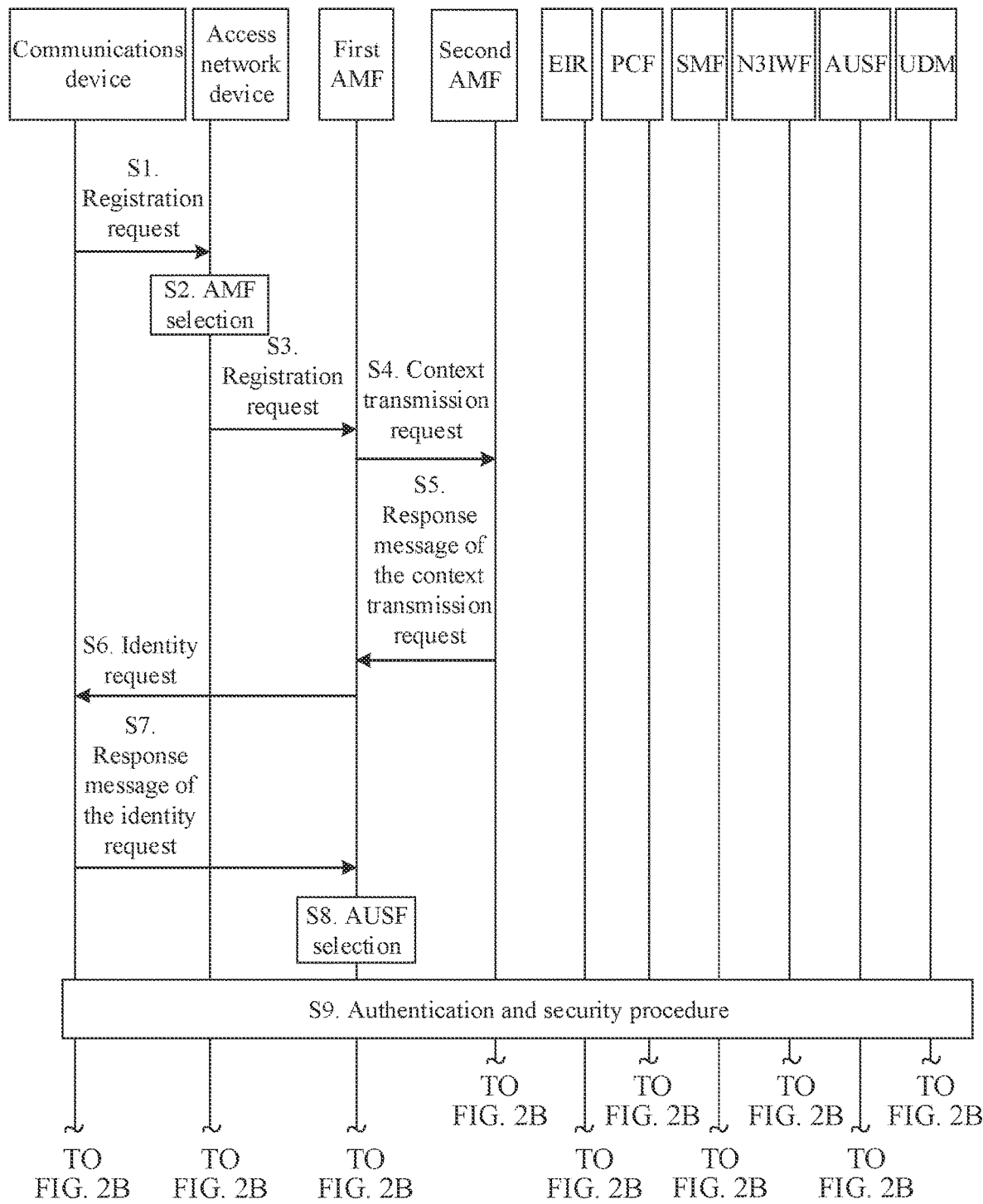
FIG. 2A and FIG. 2B are a schematic diagram of a registration procedure.
Figure 2B:
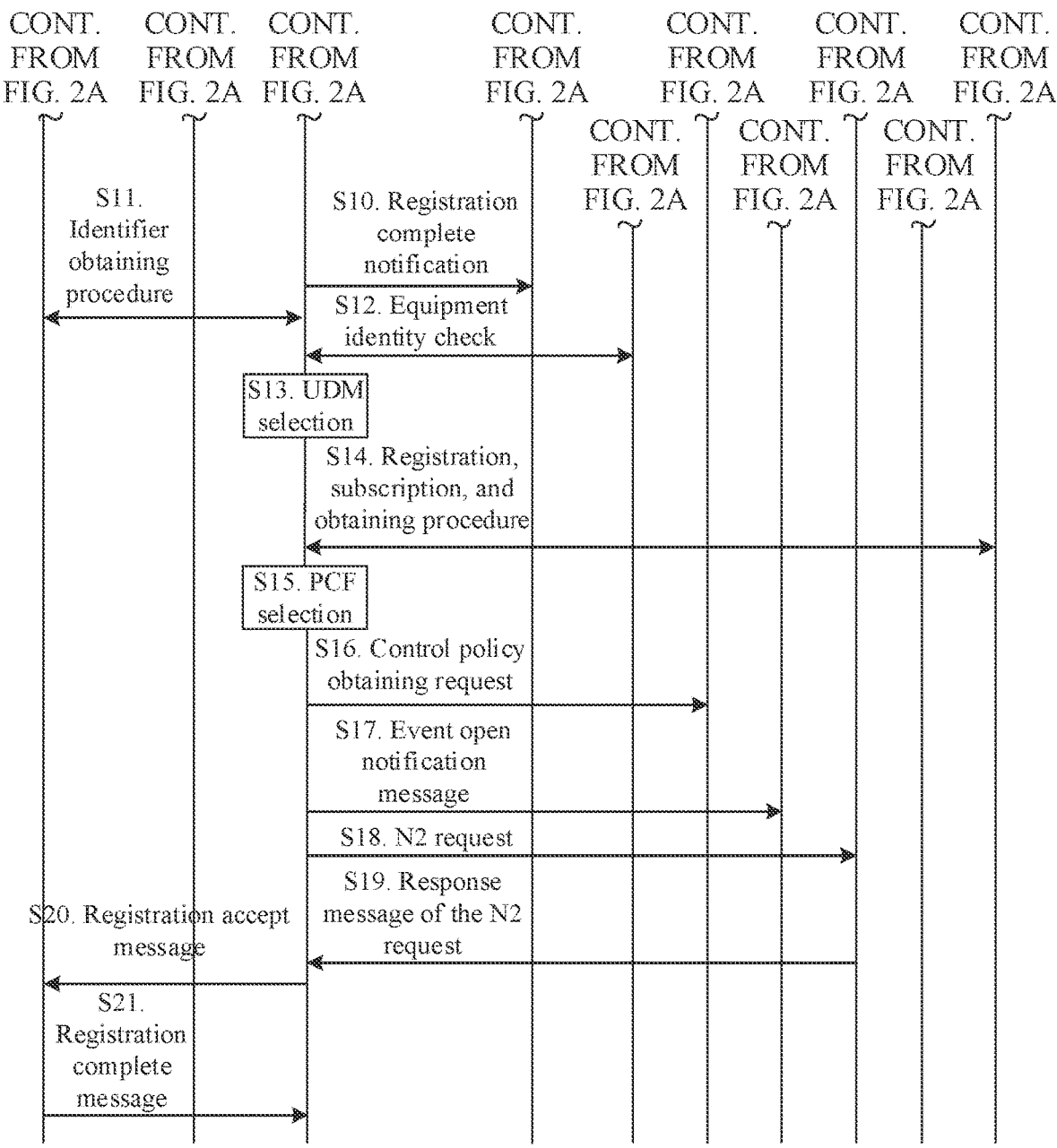

For example, as shown in FIG. 2A and FIG. 2B, the registration procedure may include the following steps.

S1. The communications device sends a registration request to an access network device.

S2. The access network device performs an access and mobility management function (access and mobility management function, AMF) selection procedure.

S3. The access network device sends a registration request to a first AMF.

S4. The first AMF determines a second AMF based on the registration request, and sends a context transmission request to the second AMF.

The first AMF is an AMF that currently provides a service for the communications device. The second AMF is an AMF that previously provides a service for the communications device.

S5. The second AMF sends a response message of the context transmission request to the first AMF.

S6. The first AMF sends an identity request (for example, an Identity Request) to the communications device.

S7. The communications device sends a response message (Identity Response) of the identity request to the first AMF.

S8. The first AMF performs an authentication server function (authentication server function, AUSF) selection procedure.

S9. The communications device performs an authentication and security procedure with the network side.

In step S9, the communications device performs a primary authentication procedure with the network side, and after the primary authentication procedure ends, the communications device establishes/activates security context with the network side.

S10. The first AMF sends a registration complete notification to the second AMF.

S11. The first AMF initiates an identifier obtaining procedure to UE.

S12. The first AMF performs equipment identity check with an equipment identity register (equipment identity register, EIR).

S13. The first AMF performs a unified data management (unified data management, UDM) selection procedure.

S14. The first AMF performs a registration, subscription, and obtaining procedure with a UDM.

S15. If the first AMF determines that policy control function (policy control function, PCF) information provided by the second AMF is unavailable, the first AMF performs a PCF selection procedure.

S16. If the first AMF determines that PCF information provided by the second AMF is available, and a PCF indicated in the PCF information is a PCF used by the second AMF, the first AMF sends a control policy obtaining request to the PCF.

S17. The first AMF sends an event opening notification message to an SMF.

S18. The first AMF sends an N2 request to a non-3GPP interworking function (non-3GPP interworking function, N3IWF).

S19. The N3IWF returns a response message of the N2 request to the first AMF.

S20. The first AMF sends a registration accept message (for example, a Registration Accept) to the communications device.

The registration accept message is used to indicate that the network side to accept registration of the communications device.

S21. The communications device sends a registration complete message (for example, Registration complete) to the first AMF.

It may be understood that the registration complete message is used to indicate that the registration procedure is completed.

The steps in the registration procedure are described above. The registration procedure may further include another step. The embodiments of this application are not limited thereto.

For specific descriptions of the registration procedure, refer to related descriptions in 3GPP TS 23.502. Details are not described herein.

7. Device Authentication

The device authentication is used to verify an identity of a communications device. The device authentication may also be referred to as device authentication. The embodiments of this application are not limited thereto.

A device authentication procedure mainly involves the communications device, an authentication point device, and an authentication server. The authentication point device is configured to be responsible for signaling exchange in the device authentication procedure. The authentication server is usually responsible for providing an authentication service for the communications device, and verifying whether the communications device is trusted.

It should be noted that the device authentication procedure may be initiated by the communications device, or may be initiated by the authentication point device.

It may be understood that the authentication server may be integrated into the authentication point device. Alternatively, the authentication server may not be integrated into the authentication point device, in other words, the authentication server is an independent device.

The terms in the embodiments of this application are described above, and are not described below.

The technical solutions provided in the embodiments of this application may be applied to various communications systems, for example, a 5G communications system, a future evolved system, or a plurality of converged communications systems. The technical solutions provided in this application may be applied to a plurality of application scenarios, for example, machine to machine (machine to machine, M2M), macro-micro communication, enhanced mobile broadband (enhanced mobile broadband, eMBB), ultra-reliable low-latency communication (ultra-reliable & low latency communication, uRLLC), and massive machine-type communications (massive machine type communication, mMTC). These scenarios may include but are not limited to a scenario of communication between communications devices, a scenario of communication between network devices, a scenario of communication between a network device and a communications device, and the like. The following provides descriptions by using an example in which the technical solutions are applied to a scenario of communication between a network device and a terminal.

In addition, network architectures and service scenarios described in the embodiments of this application are intended to describe the technical solutions in the embodiments of this application more clearly, and do not constitute a limitation on the technical solutions provided in the embodiments of this application. A person of ordinary skill in the art may learn that with evolution of the network architectures and emergence of new service scenarios, the technical solutions provided in the embodiments of this application are also applicable to similar technical problems.

Figure 3:
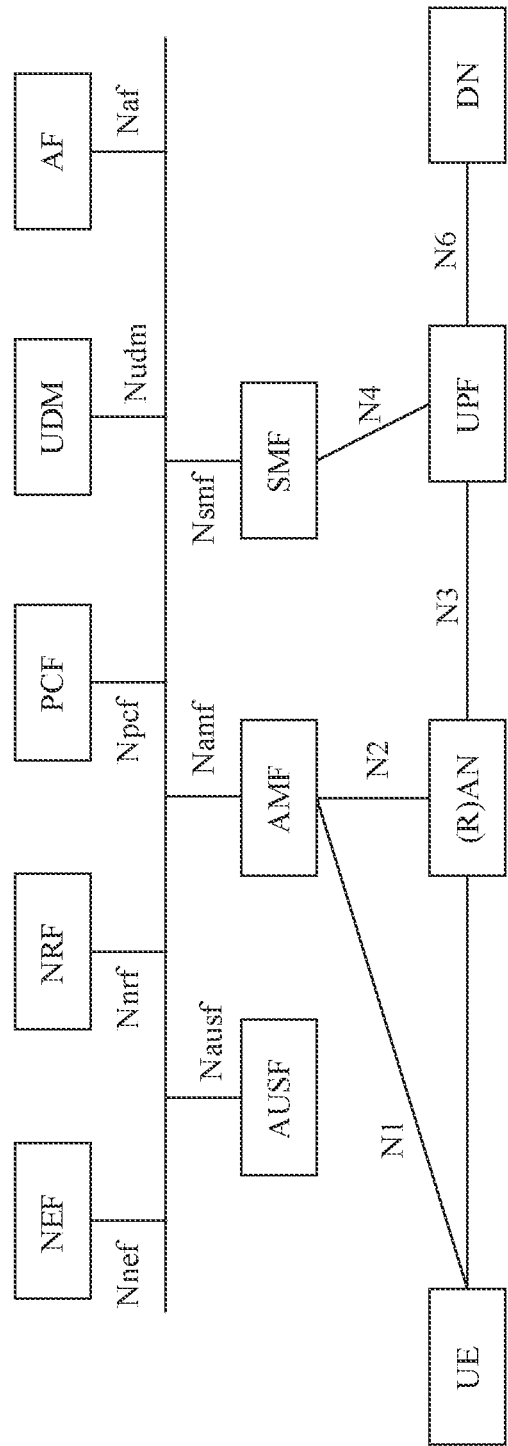
FIG. 3 is a schematic diagram of an architecture of a 5G network according to an embodiment of this application.

FIG. 3 shows an architecture of a 5G network to which the technical solutions provided in the embodiments of this application are applicable. The 5G network may include a terminal, a radio access network (radio access network, RAN) or an access network (access network, AN) (where the RAN and the AN are collectively referred to as a (R)AN below), a core network (core network, CN), and a data network (data network, DN).

The terminal may have a wireless transceiver function. The terminal may have different names, for example, user equipment (user equipment, UE), an access terminal, a terminal unit, a terminal station, a mobile station, a mobile station, a remote station, a remote terminal, a mobile device, a wireless communications device, a terminal agent, or a terminal apparatus. The terminal may be deployed on land, including an indoor or outdoor device, a handheld device, or a vehicle-mounted device, or may be deployed on a water surface (for example, on a ship), or may be deployed in air (for example, on an aircraft, a balloon, or a satellite). The terminal includes a handheld device, a vehicle-mounted device, a wearable device, or a computing device that has a wireless communication function. For example, the terminal may be a mobile phone (mobile phone), a tablet computer, or a computer having a wireless transceiver function. Alternatively, the terminal device may be a virtual reality (virtual reality, VR) terminal device, an augmented reality (augmented reality, AR) terminal device, a wireless terminal in industrial control, a wireless terminal in self-driving, a wireless terminal in telemedicine, a wireless terminal in a smart grid, a wireless terminal in a smart city (smart city), a wireless terminal in a smart home (smart home), or the like. In the embodiments of this application, an apparatus for implementing a function of the terminal may be a terminal, or may be an apparatus that can support the terminal in implementing the function, for example, a chip system. In the embodiments of this application, the chip system may include a chip, or may include a chip and another discrete component. In the embodiments of this application, an example in which the apparatus configured to implement the function of the terminal is the terminal is used to describe the technical solutions provided in the embodiments of this application.

The access network device may also be referred to as a base station. There may be various forms of base stations, for example, a macro base station, a micro base station (also referred to as a small cell), a relay station, and an access point. Specifically, the base station may be an access point (access point, AP) in a wireless local area network (Wireless Local Area Network, WLAN), a base transceiver station (Base Transceiver Station, BTS) in a global system for mobile communications (Global System for Mobile Communications, GSM) or code division multiple access (Code Division Multiple Access, CDMA), a NodeB (NodeB, NB) in wideband code division multiple access (Wideband Code Division Multiple Access, WCDMA), an evolved NodeB (Evolved Node B, eNB or eNodeB), a relay station, an access point, a vehicle-mounted device, or a wearable device in LTE, a next generation NodeB (The Next Generation Node B, gNB) in a future 5G network, a base station in a future evolved public land mobile network (Public Land Mobile Network, PLMN), or the like.

The base station usually includes a baseband unit (baseband unit, BBU), a remote radio unit (remote radio unit, RRU), an antenna, and a feeder used to connect the RRU and the antenna. The BBU is configured to be responsible for signal modulation. The RRU is configured to be responsible for radio frequency processing. The antenna is configured to be responsible for conversion between a pilot wave on a cable and a space wave in the air. On one hand, a distributed base station greatly shortens a length of the feeder between the RRU and the antenna, to reduce a signal loss, and reduce costs of the feeder. On the other hand, the RRU and the antenna are relatively small and can be installed anywhere, making network planning more flexible. The RRU may be remotely placed. In addition, all BBUs may be centralized and placed in a central office (central office, CO). In this centralized manner, a quantity of base station equipment rooms can be greatly reduced, energy consumption of auxiliary devices, especially air conditioners, can be reduced, and carbon emissions can be greatly reduced. In addition, after distributed BBUs are integrated into a BBU baseband pool, the BBUs can be managed and scheduled centrally, and resources can be allocated more flexibly. In this mode, all physical base stations evolve into virtual base stations. All the virtual base stations share information such as data sent and received by users and channel quality in the BBU baseband pool, and cooperate with each other, to implement joint scheduling.

In some deployments, the base station may include a centralized unit (centralized unit, CU) and a distributed unit (distributed unit, DU). The base station may further include an active antenna unit (active antenna unit, AAU). The CU implements some functions of the base station, and the DU implements some functions of the base station. For example, the CU is responsible for processing a non-real-time protocol and service, and implements functions of a radio resource control (radio resource control, RRC) layer and a packet data convergence protocol (packet data convergence protocol, PDCP) layer. The DU is responsible for processing a physical layer protocol and a real-time service, and implements functions of a radio link control (radio link control, RLC for short) layer, a media access control (media access control, MAC) layer, and a physical (physical, PHY) layer. The AAU implements some physical layer processing functions, radio frequency processing, and a function related to an active antenna. Information at the RRC layer eventually becomes information at the PHY layer, or is converted from the information at the PHY layer. Therefore, in this architecture, higher layer signaling, for example, RRC layer signaling or PDCP layer signaling, may also be considered as being sent by the DU or sent by the DU and the AAU. It may be understood that, in the embodiments of this application, the access network device may be a device including one or more of the CU node, the DU node, and the AAU node. In addition, the CU may be classified as a network device in a RAN, or the CU may be classified as a network device in a core network (core network, CN). This is not limited herein.

In a possible design, for the base station, a control plane (control plane, CP) and a user plane (user plane, UP) of the CU may be further separated and implemented by using different entities. In other words, the CU may be divided into a CU-CP and a CU-UP.

The core network includes a plurality of core network elements (or referred to as network function network elements) such as an AMF network element, a session management function (session management function, SMF) network element, a PCF network element, a user plane function (user plane function, UPF) network element, an application function (application function) network element, an AUSF network element, and a UDM network element.

In addition, the core network may further include some network elements not shown in FIG. 3, for example, a security anchor function (security anchor function, SEAF)

network element and an authentication credential repository and processing function (authentication credential repository and processing function, ARPF) network element. Details are not described herein in the embodiments of this application.

The UDM network element is configured to: store subscription information of a user, generate an authentication parameter and the like. The unified data management supports functions such as 3GPP authentication, a user identity operation, permission granting, and registration and mobility management.

The ARPF network element has an authentication credential repository and processing function, and is configured to store a long-term authentication credential of the user, for example, a permanent key K. In a 5G network, a function of the ARPF network element may be integrated into the UDM network element.

The SEAF network element is configured to complete authentication on UE. In the 5G network, a function of the SEAF may be integrated into the AMF.

The AUSF network element has an authentication server function, and is configured to terminate an authentication function requested by the SEAF network element. Specifically, in an authentication process, the AUSF receives an authentication vector sent by the UDM, processes the authentication vector, and sends the processed authentication vector to the SEAF.

The AMF network element is mainly responsible for mobility management processing, for example, functions such as access control, mobility management, attachment and detachment, and SMF selection. When the AMF network element provides a service for a session in the terminal, the AMF network element provides a control plane storage resource for the session, to store a session identifier, an SMF identifier associated with the session identifier, and the like.

It should be noted that the core network elements may have other names. The embodiments of this application are not limited thereto. For example, the AMF network element may also be referred to as an AMF or an AMF entity, and the UPF network element may also be referred to as a UPF or a UPF entity.

The terminal communicates with the AMF by using a next generation (Next generation, N) 1 interface (N1 for short), the RAN device communicates with the AMF by using an N2 interface (N2 for short), the RAN device communicates with the UPF by using an N3 interface (N3 for short), and the UPF communicates with the DN by using an N6 interface (N6 for short).

Control planes such as the AMF, the SMF, the UDM, the AUSF, or the PCF may interact by using a service-oriented interface. For example, as shown in FIG. 3, a service-oriented interface externally provided by the AMF may be Namf, a service-oriented interface externally provided by the SMF may be Nsmf, a service-oriented interface externally provided by the UDM may be Nudm, a service-oriented interface externally provided by the PCF may be Npcf, and a service-oriented interface externally provided by the AUSF may be Nausf. Details are not described herein.

Figure 4:
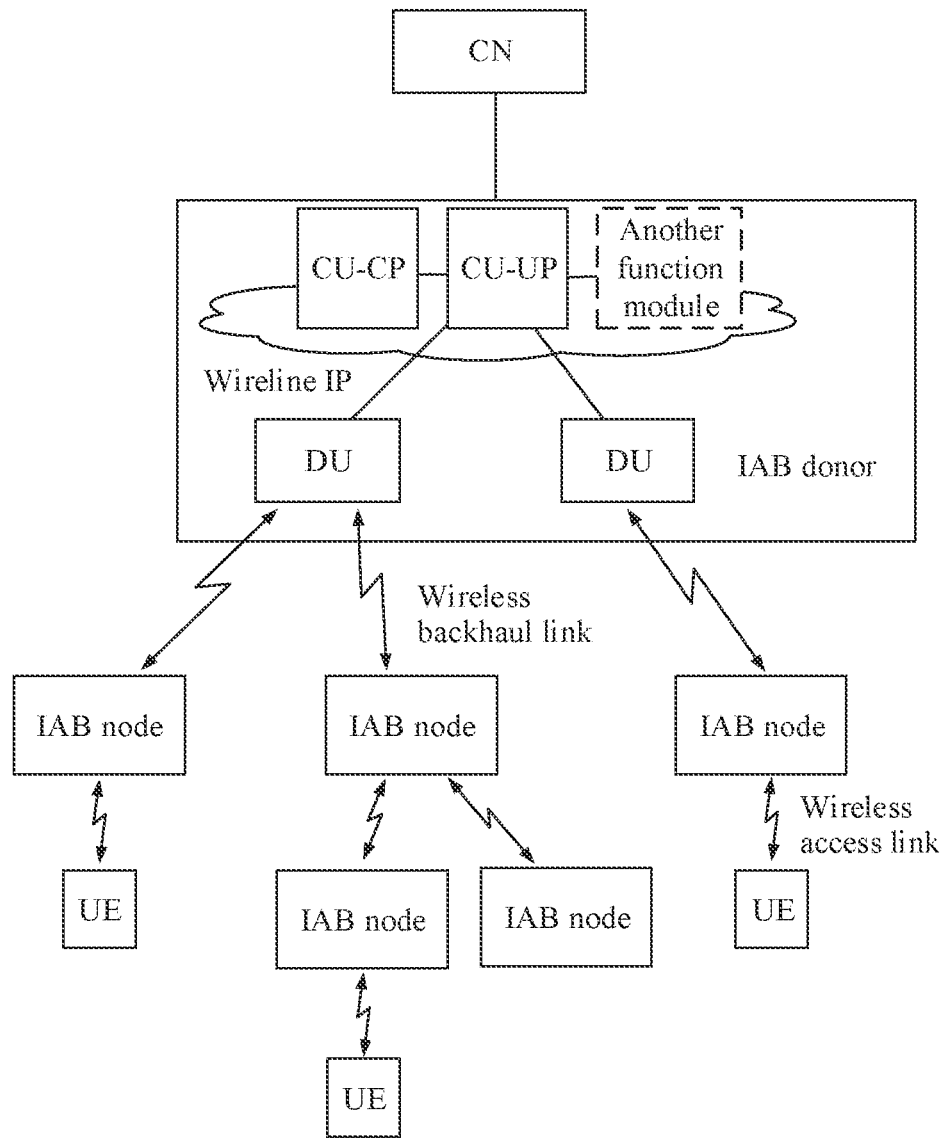
FIG. 4 is a schematic diagram of an IAB architecture according to an embodiment of this application.

To ease a burden of constructing a wired transmission network and provide flexible and dense NR deployment, an IAB technology is provided in 5G NR. FIG. 4 is a schematic diagram of an IAB architecture according to an embodiment of this application. As shown in FIG. 4, an access network that uses the IAB technology may include an IAB node and an IAB donor eNodeB (donor).

The IAB donor has a function and a role similar to those of a conventional gNB, and is configured to provide an interface of the core network. However, the IAB donor further supports a wireless backhaul (wireless backhaul) function of the IAB node. The IAB donor includes a CU and a DU. The CU may be further divided into a CU-UP, a CU-CP, and another function module.

A wireless access link (wireless access link) and a wireless backhaul link (wireless backhaul link) are integrated into the IAB node. Therefore, the IAB node can support wireless access of a terminal and wireless backhaul of data. The IAB node may include a mobile terminal (mobile terminal, MT) and a DU. The MT is configured to: support a mobile terminal function of the IAB node, and assist the IAB node in performing network access authentication and establishing communication security.

Figure 5:
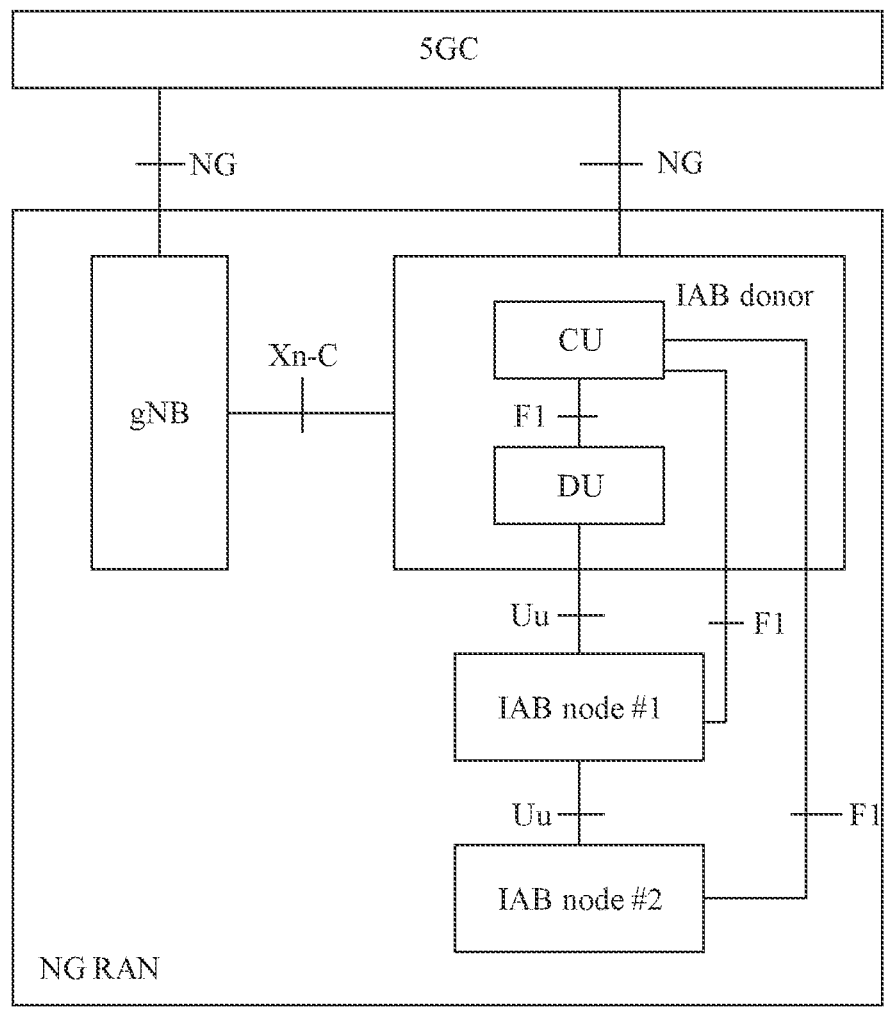
FIG. 5 is a schematic diagram of another IAB architecture according to an embodiment of this application.

As shown in FIG. 5, the IAB node and the IAB-donor-CU may communicate by using an F1 interface. The IAB node and the IAB-donor-DU may communicate by using a Uu interface. Two different IAB nodes may communicate by using the Uu interface. The IAB-donor-CU may be connected to the core network by using an NG interface. The IAB-donor-CU may be connected to the gNB by using an Xn-c interface.

It should be noted that in a 5G network or another future network, the foregoing interfaces such as the F1 interface and the Uu interface may have other names. This is not limited in the embodiments of this application.

Figure 6:
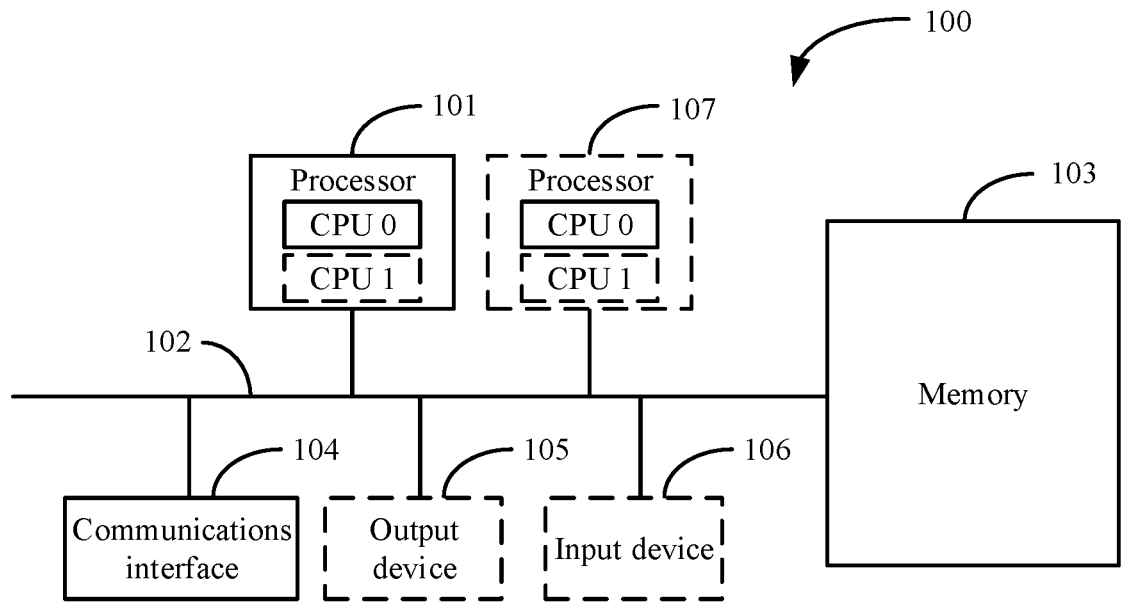
FIG. 6 is a schematic diagram of a structure of an apparatus according to an embodiment of this application.

Optionally, each of devices in the embodiments of this application, for example, the IAB node, the IAB donor, the terminal, and the core network element, may be implemented by a communications apparatus shown in FIG. 6.

As shown in FIG. 6, the apparatus 100 includes at least one processor 101, a communication line 102, a memory 103, and at least one communications interface 104.

The processor 101 may be a general-purpose central processing unit (central processing unit, CPU), a microprocessor, an application-specific integrated circuit (application-specific integrated circuit, ASIC), or one or more integrated circuits configured to control program execution of the solutions of this application.

The communication line 102 may include a path on which information is transferred between the foregoing components.

The communications interface 104 is configured to communicate with another device or a communications network, such as an Ethernet, a radio access network (radio access network, RAN), or a wireless local area network (wireless local area network, WLAN) through any apparatus such as a transceiver.

The memory 103 may be a read-only memory (read-only memory, ROM) or another type of static storage device that can store static information and instructions, random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store program code in a form of an instruction or a data structure and that can be accessed by a computer. However, the memory is not limited thereto. The memory may exist independently, and is connected to the processor through the communication line 102. Alternatively, the memory may be integrated with the processor.

The memory 103 is configured to store computer-executable instructions for performing the solutions in this application, and the processor 101 controls execution of the computer-executable instructions. The processor 101 is configured to execute the computer-executable instructions stored in the memory 103, to implement the packet transmission methods provided in the following embodiments of this application.

Optionally, the computer-executable instructions in this embodiment of this application may also be referred to as application program code. This is not specifically limited in this embodiment of this application.

During specific implementation, in an embodiment, the processor 101 may include one or more CPUs such as a CPU 0 and a CPU 1 shown in FIG. 6.

During specific implementation, in an embodiment, the apparatus 100 may include a plurality of processors, for example, the processor 101 and a processor 107 in FIG. 6. Each of the processors may be a single-core (single-CPU) processor or a multi-core (multi-CPU) processor. The processor herein may refer to one or more devices, circuits, and/or processing cores configured to process data (for example, computer program instructions).

During specific implementation, in an embodiment, the apparatus 100 may further include an output device 105 and an input device 106. The output device 105 communicates with the processor 101, and may display information in a plurality of manners. For example, the output device 105 may be a liquid crystal display (liquid crystal display, LCD), a light emitting diode (light emitting diode, LED) display device, a cathode ray tube (cathode ray tube, CRT) display device, or a projector (projector). The input device 106 communicates with the processor 101, and may receive an input from a user in a plurality of manners. For example, the input device 106 may be a mouse, a keyboard, a touchscreen device, or a sensor device.

The technical solutions provided in the embodiments of this application are described below in detail with reference to the accompanying drawings.

Embodiment 1

Currently, after a SIM card in a communications device is removed, the communications device directly deletes security context, and disconnects from a network. However, a network side cannot learn that the communications device disconnects from the network because the SIM card is removed, which poses a specific potential security risk.

Figure 7:
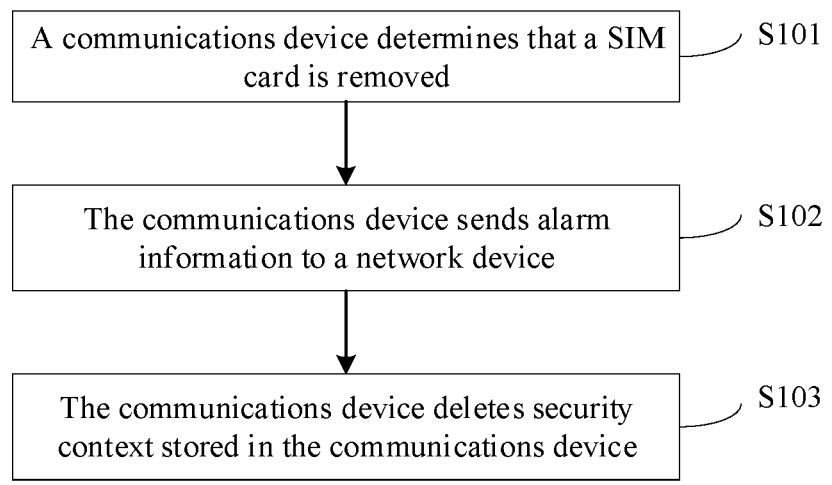
FIG. 7 is a flowchart of a communication method according to an embodiment of this application.

To resolve the foregoing technical problem, this embodiment of this application provides a communication method, so that a network side can learn whether a SIM card in a communications device is removed. As shown in FIG. 7, the communication method includes the following steps.

S101. A communications device determines that a SIM card is removed.

The SIM card is installed in the communications device, and the SIM card is bound to the communications device.

It may be understood that a cause for removal of the SIM card includes: The SIM card is damaged, the SIM card is manually removed, the SIM card is in poor contact with ME of the communications device, and so on.

In an implementation, when the communications device is in a powered-on state and the communications device accesses a communications network, the communications device monitors whether the SIM card is removed. If the communications device determines that a connection to the SIM card is interrupted, or the communications device determines that information cannot be read from the SIM card, the communications device determines that the SIM card is removed.

S102. The communications device sends alarm information to a network device, so that the network device receives the alarm information.

The alarm information is used to indicate that the SIM card is removed.

Optionally, the alarm information may include one or more of the following parameters:

(1) User identifier. It may be understood that the user identifier carried in the alarm information may be a user identifier stored in the SIM card, or may be derived from a user identifier stored in the SIM card. For example, in a 5G network, the user identifier may be an SUPI, an SUCI, and/or a 5G-GUTI.

When the alarm information carries the user identifier, a network side may learn, based on the alarm information, a mobile user corresponding to the removed SIM card, and then the network side may take a targeted measure for the mobile user, for example, forbid the mobile user to access the communications network.

(2) Equipment identity. For example, the equipment identity may be a MAC address, a device name, or the like.

When the alarm information carries the equipment identity, the network side may locate, based on the alarm information, the communications device from which the SIM card is removed, and then the network side may take a targeted measure for the communications device, for example, dispatch an operation and maintenance person to check onsite an installation status of the SIM card in the communications device.

(3) Alarm cause. The alarm cause is used to indicate a trigger event of the alarm information. In this embodiment of this application, the trigger event is an event that the SIM card in the ME is removed.

(4) Alarm time. The alarm time is used to indicate an occurrence time of the trigger event.

Certainly, the alarm information may further include another parameter. This embodiment of this application is not limited thereto.

It may be understood that after the SIM card is inserted into the communications device and the communications device accesses the communications network and completes security activation, the communications device stores security context. Therefore, the communications device may perform security protection on the alarm information based on the stored security context, to ensure security of the alarm information in a transmission process. The security protection may include at least one of the following: encryption protection and integrity protection.

For example, the network device may be an access network device or a mobility management network element. In a 4G network, the mobility management network element may be a mobility management entity (mobility management entity, MME). In the 5G network, the mobility management network element may be an AMF. In a future evolved system, the mobility management network element may be a NAS security termination point similar to an MME/AMF.

Optionally, after receiving the alarm information, the network device may store the alarm information.

Optionally, after receiving the alarm information, the network device may send the alarm information to another network device.

For example, the another network device may be a data management network element, an authentication service network element, or a network management system. In the 5G network, the data management network element may be a UDM, and the authentication service network element may be an AUSF. Unified descriptions are provided herein, and details are not described below. The network management system may be an operation administration and maintenance (operation administration and maintenance, OAM) system.

Optionally, after the another network device receives the alarm information, the another network device may also store the alarm information. For example, after the UDM receives the alarm information, the UDM stores the alarm information in subscription data corresponding to the SIM card. For another example, after the AMF receives the alarm information, the AMF stores the alarm information in context corresponding to the SIM card.

S103. The communications device deletes the stored security context.

In an implementation, after sending the alarm information, the communications device directly deletes the stored security context.

In another implementation, the communications device deletes the stored security context under a preset condition.

Optionally, the preset condition includes at least one of the following:

Condition 1: The communications device receives response information of the alarm information.

Condition 2: A timer configured by the communications device expires. The timer may start timing after the communications device sends the alarm information. Alternatively, the timer may start timing after the communications device determines that the SIM card is removed.

It may be understood that the condition 1 and the condition 2 are merely examples of the preset condition, and constitute no limitation on the preset condition.

Optionally, when the preset condition is the condition 1, if the communications device does not receive the response information of the alarm information in a preset time, the communications device may send the alarm information again, to ensure that the network side can receive the alarm information.

It should be noted that after the communications device deletes the stored security context, the communications device disconnects from the communications network.

The operation performed by the communications device in FIG. 7 may be performed by the ME of the communications device.

Based on the technical solution shown in FIG. 7, after the communications device determines that the SIM card is removed, the communications device sends the alarm information. Security protection is performed on the alarm information based on the security context, so that the network side trusts the alarm information. In this way, the network side can learn, based on the alarm information, that the SIM card is removed from the communications device, and then the network side can take a targeted measure, to avoid a potential security risk posed by removal of the SIM card.

For example, the UDM receives the alarm information. The UDM stores the alarm information in the subscription data of the mobile user corresponding to the SIM card. In this way, when the UDM receives an authentication request for the mobile user corresponding to the SIM card next time, the UDM may directly reject the authentication request, so that the mobile user corresponding to the SIM card cannot access the communications network, to prevent an unauthorized device from accessing the communications network by using the removed SIM card. Alternatively, the UDM may indicate a related network element (for example, an AUSF) to perform device authentication on the communications device into which the SIM card is currently inserted, to determine whether the communications device into which the SIM card is currently inserted matches the SIM card, so as to prevent an unauthorized device from accessing the communications network by using the removed SIM card.

For example, the OAM system receives the alarm information. The OAM system may generate a corresponding work order based on the alarm information, and dispatch the work order to an operation and maintenance person, so that the operation and maintenance person checks whether the SIM card in the communications device is loose or removed. If the operation and maintenance person finds that the SIM card in the communications device is unavailable or removed, the operation and maintenance person updates the communications device with a new SIM card, and the operation and maintenance person may indicate, by using the OAM system, a UDM to add the user identifier stored in the old SIM card (namely, the removed SIM card) to a blacklist, to prevent an attacker from accessing the communications network by using the old SIM card. If the operation and maintenance person finds that the SIM card in the communications device is loose, the operation and maintenance person can insert the SIM card into the ME of the communications device again, and the operation and maintenance person may indicate, by using the OAM system, the UDM to delete the alarm information.

For example, the OAM system receives the alarm information. The OAM system may generate a corresponding work order based on the alarm information, and dispatch the work order to an operation and maintenance person, so that the operation and maintenance person checks and/or modifies the subscription data and/or configuration information of the mobile user corresponding to the removed SIM card.

An implementation in which the communications device sends the alarm information by using a signaling plane is described below with reference to FIG. 8.

For example, the network device is a mobility management network element. In this case, as shown in FIG. 8, step S102 may be specifically implemented as S102a.

S102a. The communications device sends, to the mobility management network element, NAS signaling on which NAS security protection is performed based on the security context, where the NAS signaling includes the alarm information.

For example, the NAS signaling may be an uplink NAS transport (UL NAS Transport) message. This embodiment of this application is not limited thereto.

It may be understood that the mobility management network element performs security deprotection on the NAS signaling, to obtain the alarm information.

Figure 8:
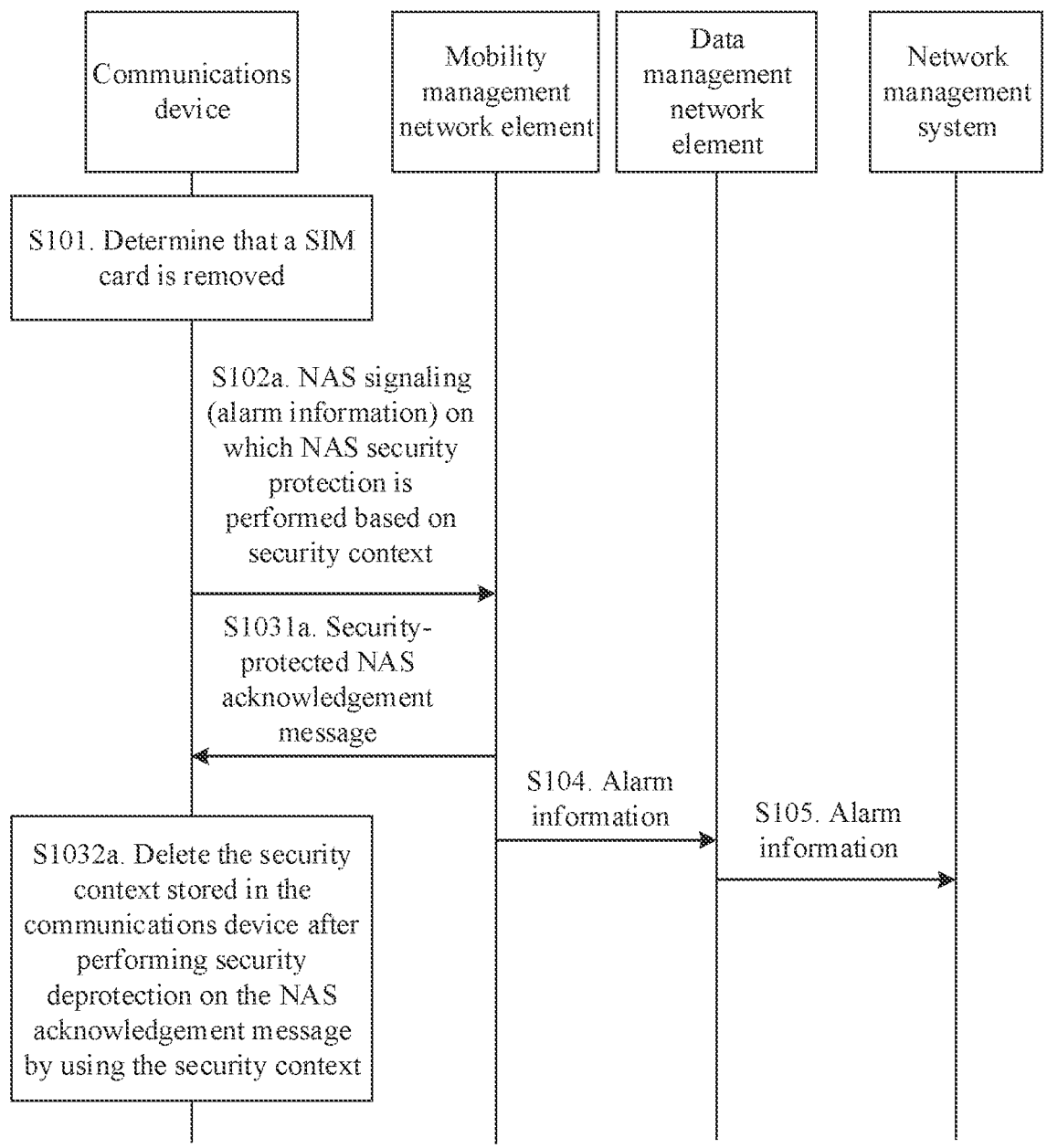
FIG. 8 is a flowchart of another communication method according to an embodiment of this application.

Optionally, based on step S102a, as shown in FIG. 8, step S103 may be specifically implemented as steps S1031a and S1032a.

S1031a. The mobility management network element sends a security-protected NAS acknowledgment message to the communications device, so that the communications device receives the NAS acknowledgment message from the mobility management network element.

NAS security protection is performed on the NAS acknowledgment message based on the security context.

For example, the NAS acknowledgment message may be a DL NAS transport ACK. This embodiment of this application is not limited thereto.

It may be understood that the NAS acknowledgment message is equivalent to the foregoing response information of the alarm information.

S1032a. The communications device deletes the stored security context after performing security deprotection on the NAS acknowledgment message by using the security context.

Security deprotection includes decryption and/or integrity check.

Optionally, as shown in FIG. 8, after step S102a, the communication method may further include step S104.

S104. The mobility management network element sends the alarm information to the data management network element, so that the data management network element receives the alarm information from the mobility management network element.

Optionally, the alarm information may be carried in Nudm interface information, for example, Nudm_SDM_info.

For example, the data management network element may determine, based on the user identifier carried in the alarm information, the subscription data corresponding to the user identifier. Then, the data management network element stores the alarm information in the subscription data corresponding to the user identifier.

Optionally, as shown in FIG. 8, after step S104, the communication method may further include step S105.

S105. The data management network element sends the alarm information to the network management system, so that the network management system receives the alarm information from the data management network element.

It should be noted that the network management system may subscribe to an event from the UDM. In this way, after receiving the alarm information, the UDM may actively send the alarm information to the network management system.

An implementation in which the communications device sends the alarm information by using a user plane is described below with reference to FIG. 9.

For example, the network device is an access network device. In this case, as shown in FIG. 9, step S102 may be specifically implemented as S102b.

S102b. The communications device sends, to the access network device, AS signaling on which AS security protection is performed based on the security context, where the AS signaling includes the alarm information.

For example, the AS signaling may be UL AS transport. This embodiment of this application is not limited thereto.

In a possible design, when the communications device is an IAB node, the access network device may be an IAB donor.

It may be understood that the access network device performs security deprotection on the AS signaling, to obtain the alarm information.

Figure 9:
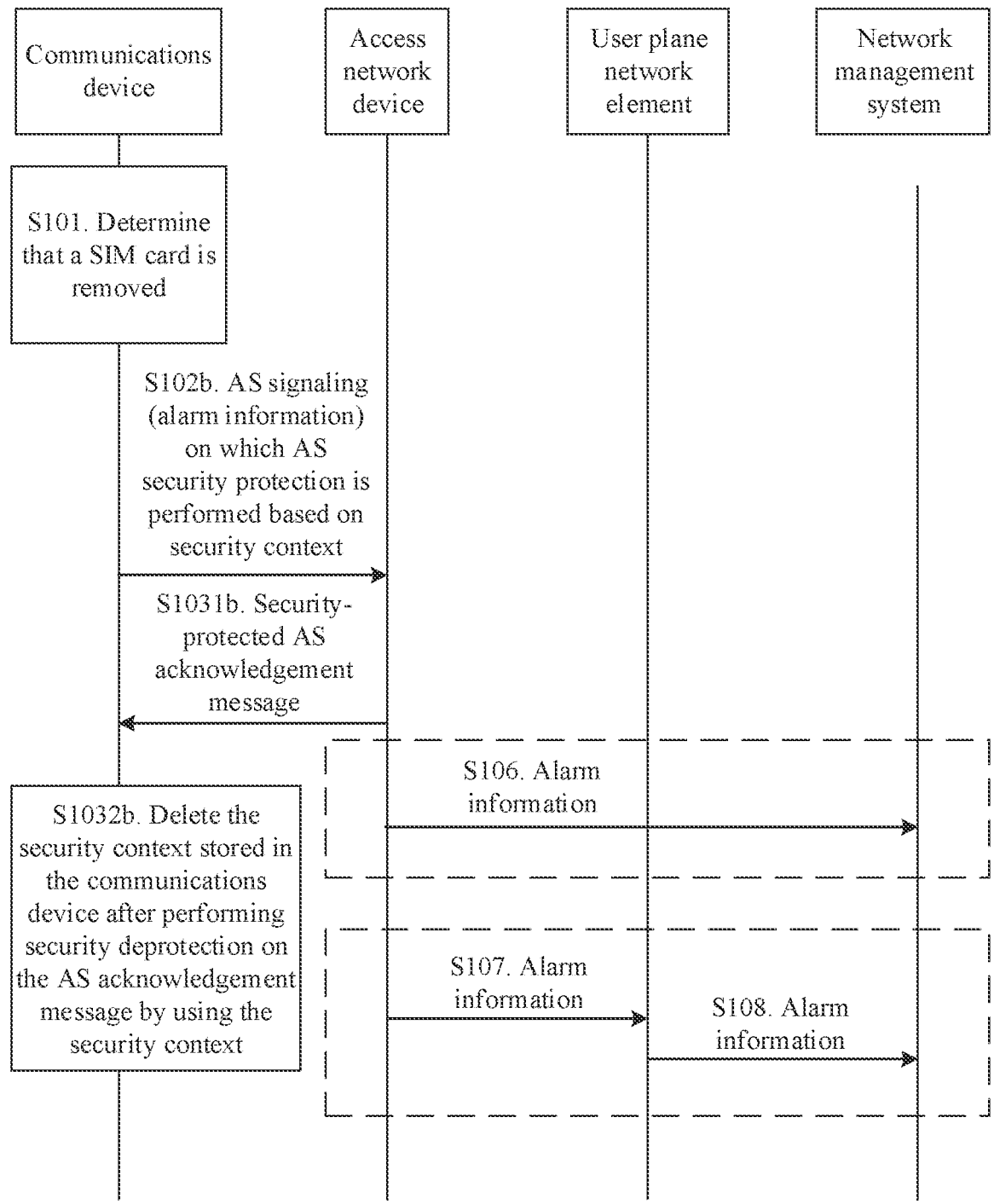
FIG. 9 is a flowchart of another communication method according to an embodiment of this application.

Optionally, based on step S102b, as shown in FIG. 9, step S103 may be specifically implemented as steps S1031b and S1032b.

S1031b. The access network device sends a security-protected AS acknowledgment message to the communications device, so that the communications device receives the AS acknowledgment message from the access network device.

AS security protection is performed on the AS acknowledgment message based on the security context.

For example, the AS acknowledgment message may be a DL AS transport ACK.

This embodiment of this application is not limited thereto.

It may be understood that the AS acknowledgment message is equivalent to the foregoing response information of the alarm information.

S1032b. The communications device deletes the stored security context after performing security deprotection on the AS acknowledgment message by using the security context.

Optionally, as shown in FIG. 9, after step S102a, the communication method may further include step S106.

S106. The access network device sends the alarm information to the network management system, so that the network management system receives the alarm information.

Alternatively, as shown in FIG. 9, step S106 may be replaced with steps S107 and S108.

S107. The access network device sends the alarm information to a user plane network element, so that the user plane network element receives the alarm information from the access network device.

For example, in the 5G network, the user plane network element may be a UPF. In the future evolved system, the user plane network element may be a functional entity responsible for transmission of user plane data. This embodiment of this application is not limited thereto.

Optionally, the alarm information may be carried in an N3 interface message.

S108. The user plane network element sends the alarm information to the network management system, so that the network management system receives the alarm information sent by the user plane network element.

In an implementation, the user plane network element sends the alarm information to the network management system by using a user plane data transmission mechanism.

It should be noted that the communication method shown in FIG. 7 to FIG. 9 is applicable only to a first-type device. That is, when a SIM card is removed from the first-type device, the first-type device sends alarm information to the network side; and when a SIM card is removed from a second-type device, the second-type device does not send alarm information to the network side.

Alternatively, the communication method shown in FIG. 7 to FIG. 9 is applicable to both a first-type device and a second-type device. That is, regardless of whether the communications device is a first-type device or a second-type device, when the SIM card is removed from the communications device, the communications device sends the alarm information to the network side.

Embodiment 2

Currently, if a SIM card in a device 1 is removed by an attacker, and the attacker installs the SIM card into a device 2, the device 2 may replace, by using user information in the SIM card, the device 1 to access a communications network. In this way, a network side mistakenly considers the device 2 as the device 1. In this case, the device 2 may perform a plurality of man-in-the-middle attacks. Consequently, there is a great potential security risk in the communications network.

An IAB network scenario is used as an example. If a SIM card in an IAB node is removed, and the SIM card is inserted into a pseudo base station, a device such as a mobile phone of a common user considers the pseudo base station as an authorized base station for network access. Consequently, the pseudo base station captures various types of private information of the common user, affecting security of the communications network. In addition, the IAB node is usually deployed in a public place. Therefore, the SIM card is prone to be removed from the IAB node by an attacker. Consequently, there is a great potential security risk in the communications network.

To resolve the foregoing technical problem, this embodiment of this application provides a communication method. A technical principle of the communication method is to bind a communications device and a SIM card in advance. Therefore, when the communications device accesses a network by using the SIM card, a network side performs device authentication on the communications device, to determine whether the communications device matches the SIM card inserted into the communications device. When the communications device does not match the SIM card inserted into the communications device, the network side forbids the communications device to access the network. When the communications device matches the SIM card inserted into the communications device, the network side allows the communications device to access the network. In this way, one SIM card can be applied only to a communications device bound to the SIM card, and cannot be applied to a communications device that is not bound to the SIM card. Therefore, in the technical solution of this application, a SIM card of an authorized device can be prevented from being applied to an unauthorized device.

For example, a SIM card 1 is bound to a device 1, and the SIM card 1 is not bound to a device 2. If the SIM card 1 is inserted into the device 1, the device 1 may access the communications network by using the SIM card 1. If the SIM card 1 is inserted into the device 2, the device 2 cannot access the communications network by using a SIM card 1.

In this embodiment of this application, a binding relationship between the communications device and the SIM card may be specifically implemented as a binding relationship between a device authentication credential and a user identifier corresponding to the SIM card. It may be understood that the binding relationship may also be referred to as a matching relationship, a correspondence, or the like.

In this embodiment of this application, the device authentication credential may include a digital certificate, a key, and/or device information. The device information includes but is not limited to an international mobile equipment identity (international mobile equipment identity, IMEI), a serial number (serial number, SN) of a device, a device name, a device type, and a factory batch of the device.

It may be understood that when the communications device is bound to the SIM card, the communications device stores the device authentication credential, and the device authentication credential stored in the communications device corresponds to the user identifier stored in the SIM card.

It may be understood that the network side also stores the binding relationship between the device authentication credential and the user identifier stored in the SIM card. That is, for one user identifier, the network side may store one or more corresponding device authentication credentials.

It may be understood that for a user identifier, if the network side stores a plurality of corresponding device authentication credentials, it indicates that a mobile user corresponding to the user identifier is bound to a plurality of communications devices, or it indicates that a SIM card that stores the user identifier is bound to a plurality of communications devices.

The technical solution provided in this embodiment of this application is described below with reference to a specific embodiment.

Figure 10:
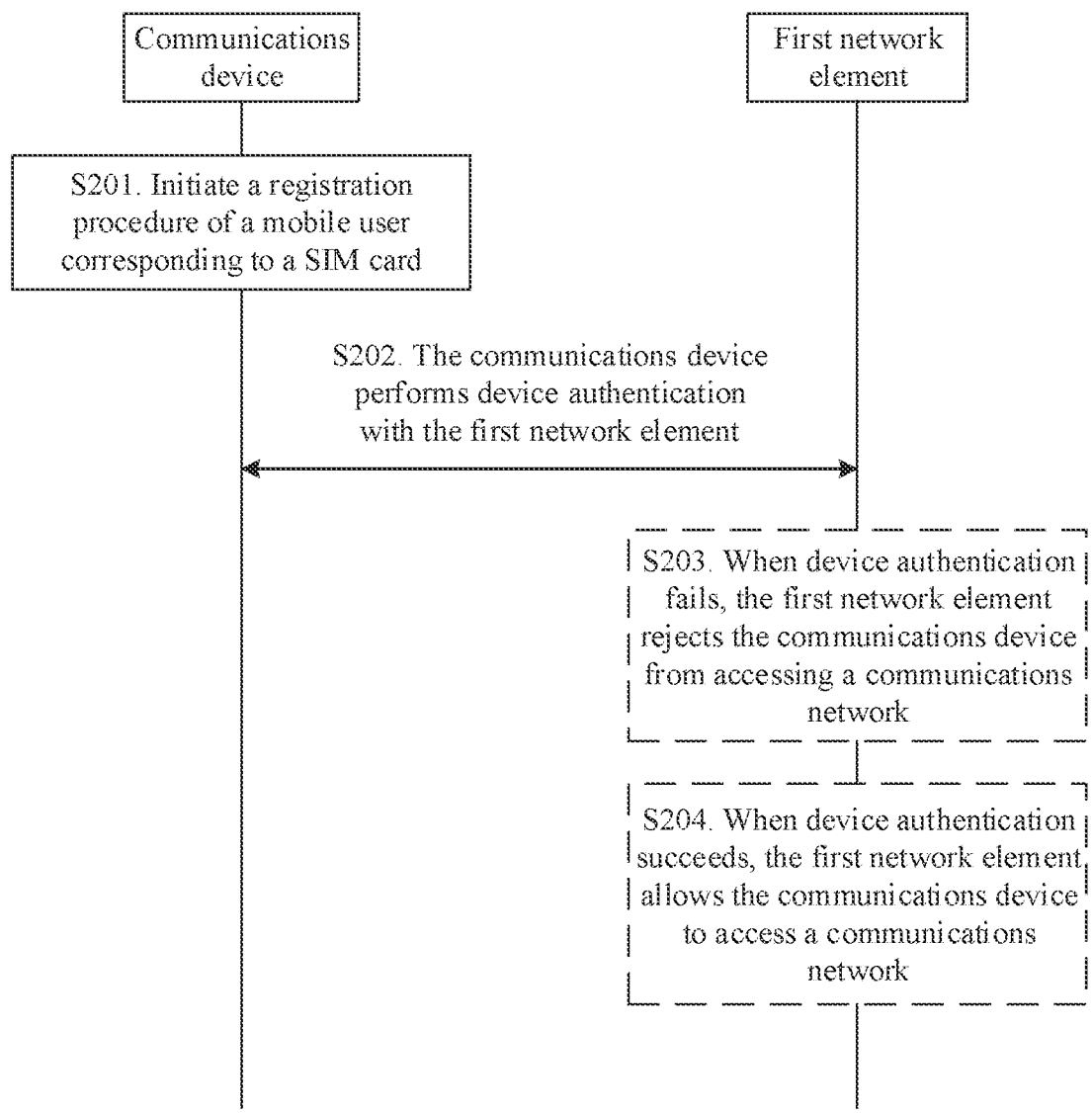
FIG. 10 is a flowchart of another communication method according to an embodiment of this application.

FIG. 10 shows a communication method according to an embodiment of this application. The communication method includes the following steps.

S201. A communications device initiates a registration procedure of a mobile user corresponding to a SIM card.

In an implementation, after the SIM card is inserted into the communications device, the communications device initiates a registration request to an access network device by reading a user identifier stored in the SIM card, to initiate the registration procedure.

The registration request includes a user identifier. It may be understood that the user identifier included in the registration request may be the user identifier stored in the SIM card inserted into the communications device, or may be derived from the user identifier stored in the SIM card. For example, in a 5G network, the user identifier may be an SUPI, an SUCI, and/or a 5G-GUTI.

S202. The communications device performs device authentication with a first network element.

The device authentication is used to verify an identity of the communications device.

Specifically, the device authentication is used to determine whether the communications device matches the SIM card inserted into the communications device. Alternatively, the device authentication is used to determine whether the communications device stores a device authentication credential that matches the SIM card inserted into the communications device. Alternatively, the device authentication is used to determine whether a device authentication credential stored in the communications device matches the user identifier stored in the SIM card inserted into the communications device.

It may be understood that if the communications device stores no device authentication credential that matches the SIM card inserted into the communications device, it indicates that the communications device does not match the SIM card inserted into the communications device. In other words, the communications device is an unauthorized device, and the communications device cannot access a communications network. If the communications device stores the device authentication credential that matches the SIM card inserted into the communications device, it indicates that the communications device matches the SIM card inserted into the communications device. In other words, the communications device is an authorized device, and the communications device may access the communications network.

In this embodiment of this application, the first network element that performs device authentication is equivalent to an authentication point. The first network element is configured to be responsible for information exchange with the communications device in a device authentication process. For example, the first network element that performs device authentication may be an IAB donor, a mobility management network element, or an authentication service network element. This embodiment of this application is not limited thereto.

In a possible design, the first network element may determine, based on an instruction from a second network element, whether device authentication needs to be performed on the communications device. For this design, refer to the following related descriptions. Details are not described herein.

In another possible design, the first network element may determine, based on a policy, whether device authentication needs to be performed on the communications device.

For example, the first network element receives device type indication information from the communications device. The device type indication information is used to indicate that the communications device is a first-type device, or the device type indication information is used to indicate that the communications device is an JAB node. In this case, the first network element determines that device authentication needs to be performed on the communications device.

In this embodiment of this application, there are two cases for the first network element: (1) An authentication server is integrated into the first network element, or the first network element stores a device authentication credential bound to the user identifier; and (2) No authentication server is integrated into the first network element, or the first network element stores no device authentication credential bound to the user identifier.

Based on the case (1), the first network element may be responsible for verifying whether the device authentication credential in the communications device is the same as a device authentication credential bound to the SIM card, to determine whether the communications device is bound to the SIM card inserted into the communications device.

Based on the case (2), the first network element needs to send the device authentication credential in the communications device to an authentication server, and the authentication server is responsible for verifying whether the device authentication credential in the communications device is the same as a device authentication credential bound to the SIM card. In addition, the first network element may further obtain a device authentication result from the authentication server. It may be understood that the device authentication result is that device authentication succeeds or device authentication fails.

When no authentication server is not integrated into the first network element, the authentication server may be the second network element or another device. For example, the first network element is an AMF. In this case, the authentication server may be a UDM or an authentication, authorization and accounting (authentication, authorization, accounting, AAA) server.

Optionally, a device authentication implementation includes but is not limited to extensible authentication protocol (extensible authentication protocol, EAP) authentication or the like. This embodiment of this application is not limited thereto.

It may be understood that a device authentication manner used between the first network element and the communications device may be preconfigured, or may be determined through negotiation between the first network element and the communications device. This embodiment of this application is not limited thereto.

In a possible design, the communications device performs device authentication with the first network element in the registration procedure. For example, the communications device performs device authentication with the first network element after successfully completing primary authentication by using the registration procedure. Alternatively, the communications device performs device authentication with the first network element before performing primary authentication by using the registration procedure. For another example, the communications device performs device authentication with the first network element after successfully completing a NAS SMC procedure by using the registration procedure. Alternatively, the communications device performs device authentication with the first network element before performing a NAS SMC procedure by using the registration procedure.

It may be understood that if the communications device performs device authentication with the first network element before performing primary authentication by using the registration procedure, when device authentication fails, a network side no longer needs to perform primary authentication on the communications device, to reduce signaling overheads.

It may be understood that if the communications device performs device authentication with the first network element after successfully completing the NAS SMC procedure by using the registration procedure, security protection may be performed on signaling in a device authentication procedure by using security context, to prevent the signaling in the device authentication procedure from being tampered with by an attacker, and ensure security of the signaling in the device authentication procedure.

In another possible design, the communications device performs device authentication with the first network element after the registration procedure ends. For example, the communications device performs device authentication with the first network element after completing an AS SMC procedure. Alternatively, the communications device performs device authentication with the first network element before performing an AS SMC procedure.

S203. When device authentication fails, the first network element rejects the communications device from accessing the communications network.

That device authentication fails may be alternatively expressed as follows: Device authentication performed on the communications device fails.

That device authentication fails may be understood as follows: The communications device stores no device authentication credential that matches the SIM card inserted into the communications device; or the device authentication credential stored in the communications device does not match an identifier of a subscribed user stored in the SIM card; or the communications device does not match the SIM card inserted into the communications device.

In this embodiment of this application, the first network element rejects the communications device from accessing the communications network, so that the communications device disconnects from the communications network.

If the device authentication procedure is performed in the registration procedure, that the first network element rejects the communications device from accessing the communications network may be specifically implemented as follows: The first network element interrupts execution of the registration procedure. For example, if the first network element is a mobility management network element, the mobility management network element may send a registration failure message to the communications device. For another example, if the first network element is an authentication service network element, the authentication service network element sends device authentication failure information to a mobility management network element, to trigger the mobility management network element to send a registration failure message to the communications device.

If the device authentication procedure is performed after the registration procedure ends, that the first network element rejects the communications device from accessing the communication network may be specifically implemented as follows: The first network element triggers a deregistration procedure. For example, if the first network element is a mobility management network element, the mobility management network element sends a deregistration request message to the communications device. For another example, if the first network element is an authentication service network element, the authentication service network element sends device authentication failure information to a mobility management network element, to trigger the mobility management network element to send a deregistration request message to the communications device.

Optionally, the registration failure message may carry a cause value of failure of device authentication. The cause value of failure of device authentication is used to indicate a cause why device authentication fails.

Optionally, the deregistration request message may carry a cause value of failure of device authentication.

The registration failure message and the deregistration request message may be collectively referred to as a reject message, and the reject message is used to disconnect the communications device from the network.

In this way, the registration failure message and the deregistration request message are equivalent to device authentication failure information, so that the communications device learns that device authentication fails.

S204. When device authentication succeeds, the first network element allows the communications device to access the communications network.

That device authentication succeeds may be alternatively expressed as follows: Device authentication performed on the communications device succeeds.

That device authentication succeeds may be understood as follows: The communications device stores the device authentication credential that matches the SIM card inserted into the communications device; or the device authentication credential stored in the communications device matches the user identifier stored in the SIM card; or the communications device matches the SIM card inserted into the communications device.

In this embodiment of this application, the first network element allows the communications device to access the communications network, so that the communications device may access the communications network.

If the device authentication procedure is performed in the registration procedure, that the first network element allows the communications device to access the communications network may be specifically implemented as follows: The first network element does not interrupt execution of the registration procedure. In other words, the first network element does not need to perform an additional operation, so that the communications device may continue to perform the registration procedure.

If the device authentication procedure is performed after the registration procedure, that the first network element allows the communications device to access the communications network may be specifically implemented as follows: The first network element does not trigger a deregistration procedure. In other words, the first network element does not need to perform an additional operation, so that the communications device may maintain a connection to the network.

It may be understood that, that the first network element allows the communications device to access the communications network does not mean that the communications device can definitely access the communications network. That is, although the first network element allows the communications device to access the communications network, whether the communications device can access the communications network needs to be determined by further considering whether another procedure (for example, the registration procedure) can be smoothly performed.

Optionally, when device authentication succeeds, the first network element may send device authentication success information to the communications device.

Based on the technical solution shown in FIG. 10, after the SIM card is inserted into the communications device, the communications device initiates the registration procedure of the mobile user corresponding to the SIM card. Then, the communications device performs device authentication with the first network element, to verify whether the communications device matches the SIM card inserted into the communications device. When the communications device matches the SIM card inserted into the communications device, the communications device may access the communications network. When the communications device does not match the SIM card inserted into the communications device, the communications device is forbidden by the first network element to access the communications network. Therefore, in the technical solution in this embodiment of this application, an unauthorized device can be prevented from accessing the communications network by using a SIM card of an authorized device, to ensure security of the communications network.

The device authentication procedure in FIG. 10 is described below in detail with reference to a specific application scenario.

Figure 11:
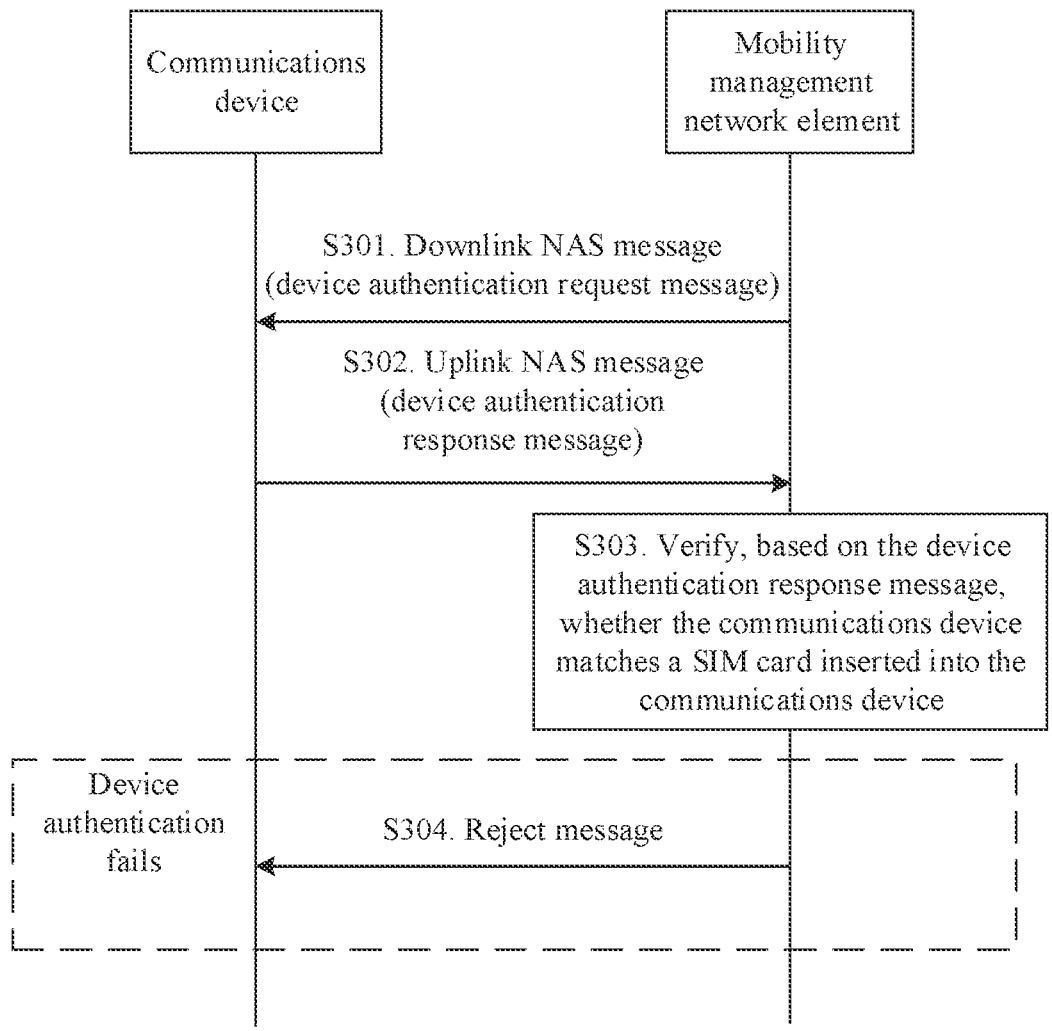
FIG. 11 is a flowchart of another communication method according to an embodiment of this application.

(1) For example, the first network element is a mobility management network element. If a function of the authentication server is integrated into the mobility management network element, as shown in FIG. 11, the device authentication procedure may include the following steps.

S301. The mobility management network element sends a downlink NAS message to the communications device, so that the communications device receives the downlink NAS message from the mobility management network element.

In this embodiment of this application, security protection is performed on the downlink NAS message based on security context.

Optionally, the downlink NAS message may be a NAS SMC message. In this way, signaling in the NAS SMC procedure is reused for the signaling in the device authentication procedure, thereby reducing signaling overheads.

The downlink NAS message includes a device authentication request message. The device authentication request message is used to request the communications device to perform device authentication.

For example, the device authentication is EAP-TLS. In this case, the device authentication request message may be an EAP request/identity.

S302. The communications device sends an uplink NAS message to the mobility management network element, so that the mobility management network element receives the uplink NAS message from the communications device.

In this embodiment of this application, security protection is performed on the uplink NAS message based on the security context.

Optionally, the uplink NAS message may be a NAS SMP message. In this way, signaling in the NAS SMC procedure is reused for the signaling in the device authentication procedure, thereby reducing signaling overheads.

The uplink NAS message includes a device authentication response message.

In this embodiment of this application, the device authentication response message includes device authentication information. The device authentication information may be the device authentication credential stored in the communications device. Alternatively, the device authentication information may be an authentication parameter generated based on the device authentication credential stored in the communications device.

For example, the device authentication is EAP-TLS. In this case, the device authentication response message may be an EAP response/identity (MyID).

It may be understood that in addition to the uplink NAS message and the downlink NAS message, in the device authentication procedure, other NAS signaling may be further transmitted between the mobility management network element and the communications device, to complete exchange of device authentication-related information. This embodiment of this application is not limited thereto.

S303. The mobility management network element verifies, based on the device authentication response message, whether the communications device matches the SIM card inserted into the communications device.

In a possible implementation, the mobility management network element obtains the device authentication information stored in the communications device from the device authentication response message. Then, the mobility management network element verifies whether the device authentication information stored in the communications device is consistent with device authentication information corresponding to the user identifier. When the device authentication information stored in the communications device is inconsistent with the device authentication information corresponding to the user identifier, the mobility management network element determines that device authentication fails. When the device authentication information stored in the communications device is consistent with the device authentication information corresponding to the user identifier, the mobility management network element determines that device authentication succeeds.

Optionally, as shown in FIG. 11, when device authentication fails, the device authentication procedure may further include step S304.

S304. The mobility management network element sends a reject message to the communications device, so that the communications device receives the reject message from the mobility management network element.

It may be understood that if the device authentication procedure is performed in the registration procedure, the reject message is a registration failure message. If the device authentication procedure is performed after the registration procedure ends, the reject message is a deregistration request message.

In this embodiment of this application, security protection may be performed on the reject message based on the security context.

Based on the technical solution shown in FIG. 11, when signaling related to the device authentication procedure is transmitted between the mobility management network element and the communications device, NAS security protection may be performed on the signaling, to ensure communication security.

If the device authentication procedure is performed in the registration procedure, when the communications device does not match the SIM card inserted into the communications device, the registration procedure of the communications device may be aborted in advance, thereby further reducing signaling overheads.

Figure 12:
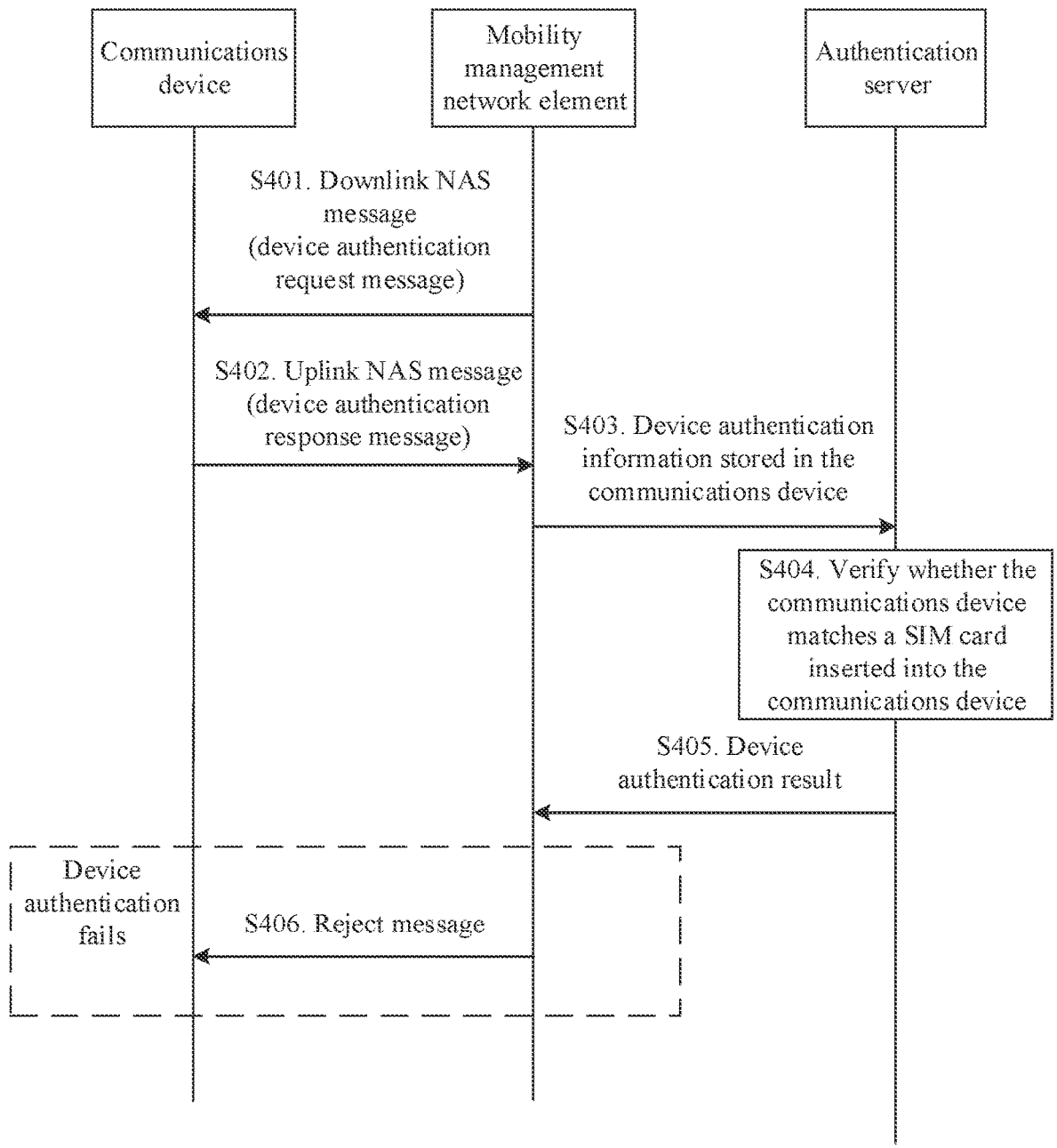
FIG. 12 is a flowchart of another communication method according to an embodiment of this application.

(2) For example, the first network element is a mobility management network element. If no authentication server is integrated into the mobility management network element, as shown in FIG. 12, the device authentication procedure may include the following steps.

S401 and S402 are the same as steps S301 and S302. For specific descriptions, refer to the embodiment shown in FIG. 11. Details are not described herein.

S403. The mobility management network element sends device authentication information stored in the communications device to an authentication server.

S404. The authentication server verifies whether the communications device matches the SIM card inserted into the communications device.

In a possible implementation, the authentication server verifies whether the device authentication information stored in the communications device is consistent with device authentication information corresponding to the user identifier. When the device authentication information stored in the communications device is inconsistent with the device authentication information corresponding to the user identifier, the authentication server determines that device authentication fails. When the device authentication information stored in the communications device is consistent with the device authentication information corresponding to the user identifier, the authentication server determines that device authentication succeeds.

S405. The authentication server sends a device authentication result to the mobility management network element.

The device authentication result is device authentication success information or device authentication failure information.

Optionally, as shown in FIG. 12, when device authentication fails, the device authentication procedure may further include step S406.

S406 is the same as step S304. For specific descriptions, refer to the embodiment shown in FIG. 11. Details are not described herein.

Figure 13:
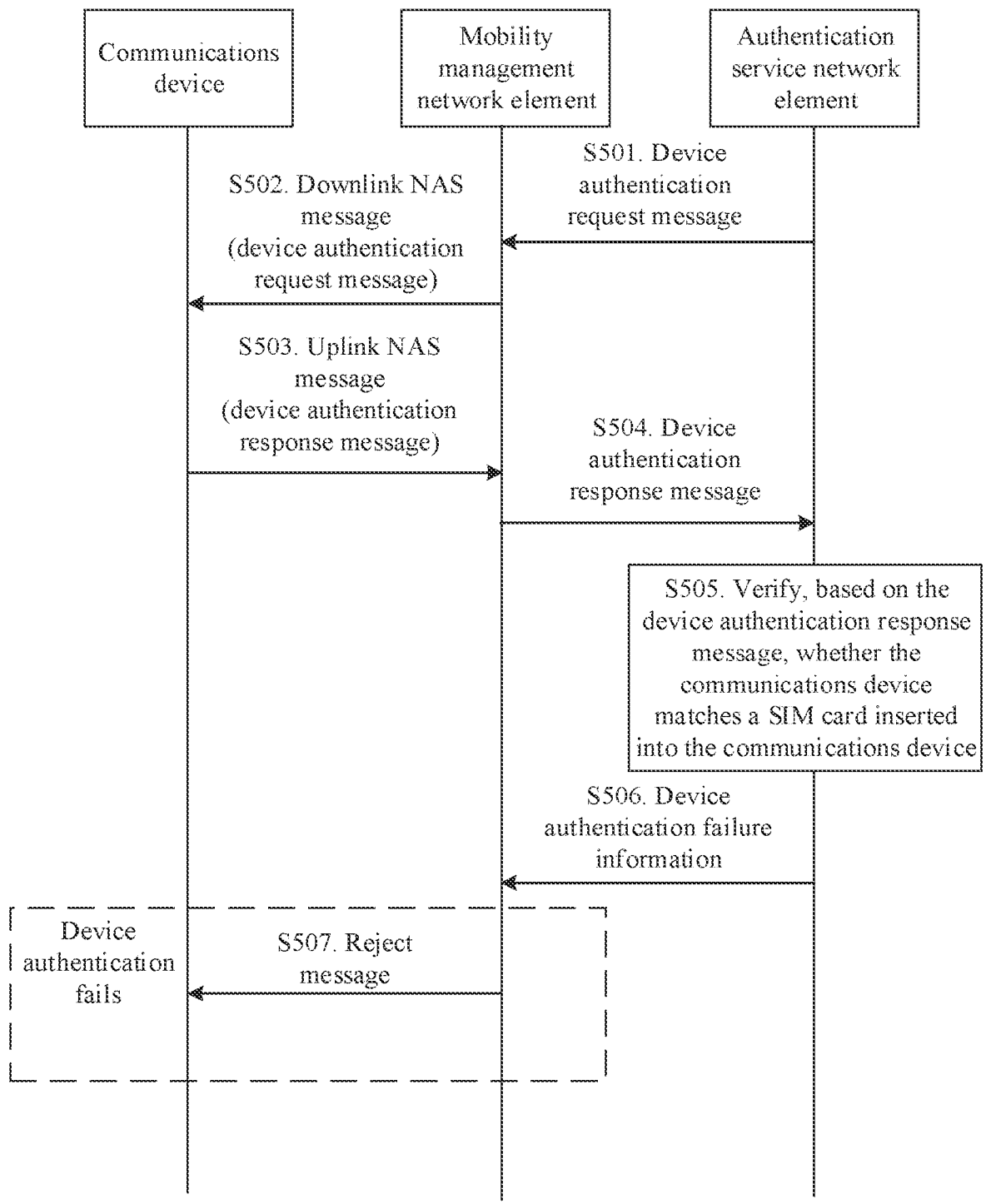
FIG. 13 is a flowchart of another communication method according to an embodiment of this application.

(3) For example, the first network element is an authentication service network element. If a function of the authentication server is integrated into the authentication service network element, as shown in FIG. 13, the device authentication procedure may include the following steps.

S501. The authentication service network element sends a device authentication request message to a mobility management network element, so that the mobility management network element receives the device authentication request message.

For example, the device authentication request message may be carried in Namf interface information.

For specific descriptions of the device authentication request message, refer to the foregoing descriptions. Details are not described herein.

S502 and S503 are the same as steps S301 and S302. For specific descriptions, refer to the embodiment shown in FIG. 11. Details are not described herein.

S504. The mobility management network element sends a device authentication response message to the authentication service network element, so that the authentication service network element receives the device authentication response message sent by the mobility management network element.

For example, the device authentication response message may be carried in Namf interface information.

For specific descriptions of the device authentication response message, refer to the foregoing descriptions. Details are not described herein.

S505. The authentication service network element verifies, based on the device authentication response message, whether the communications device matches the SIM card inserted into the communications device.

In an implementation, the authentication service network element obtains device authentication information stored in the communications device from the device authentication response message. Then, the authentication service network element verifies whether the device authentication information stored in the communications device is consistent with device authentication information corresponding to the user identifier. When the device authentication information stored in the communications device is inconsistent with the device authentication information corresponding to the user identifier, the authentication service network element determines that device authentication fails. When the device authentication information stored in the communications device is consistent with the device authentication information corresponding to the user identifier, the authentication service network element determines that device authentication succeeds.

Optionally, as shown in FIG. 13, when device authentication fails, the device authentication procedure may further include steps S506 and S507.

S506. The authentication service network element sends device authentication failure information to the mobility management network element, so that the mobility management network element receives the device authentication failure information from the authentication service network element.

In this embodiment of this application, if device authentication is performed in the registration procedure, the device authentication failure information is used to trigger the mobility management network element to send a registration failure message. If device authentication is performed after the registration procedure ends, the device authentication failure information is used to trigger the mobility management network element to initiate a deregistration procedure. Alternatively, the device authentication failure information is used to trigger the mobility management network element to send a deregistration message.

For example, the device authentication failure information may be carried in Namf interface information.

S507 is the same as step S304. For specific descriptions, refer to the embodiment shown in FIG. 11. Details are not described herein.

Figure 14:
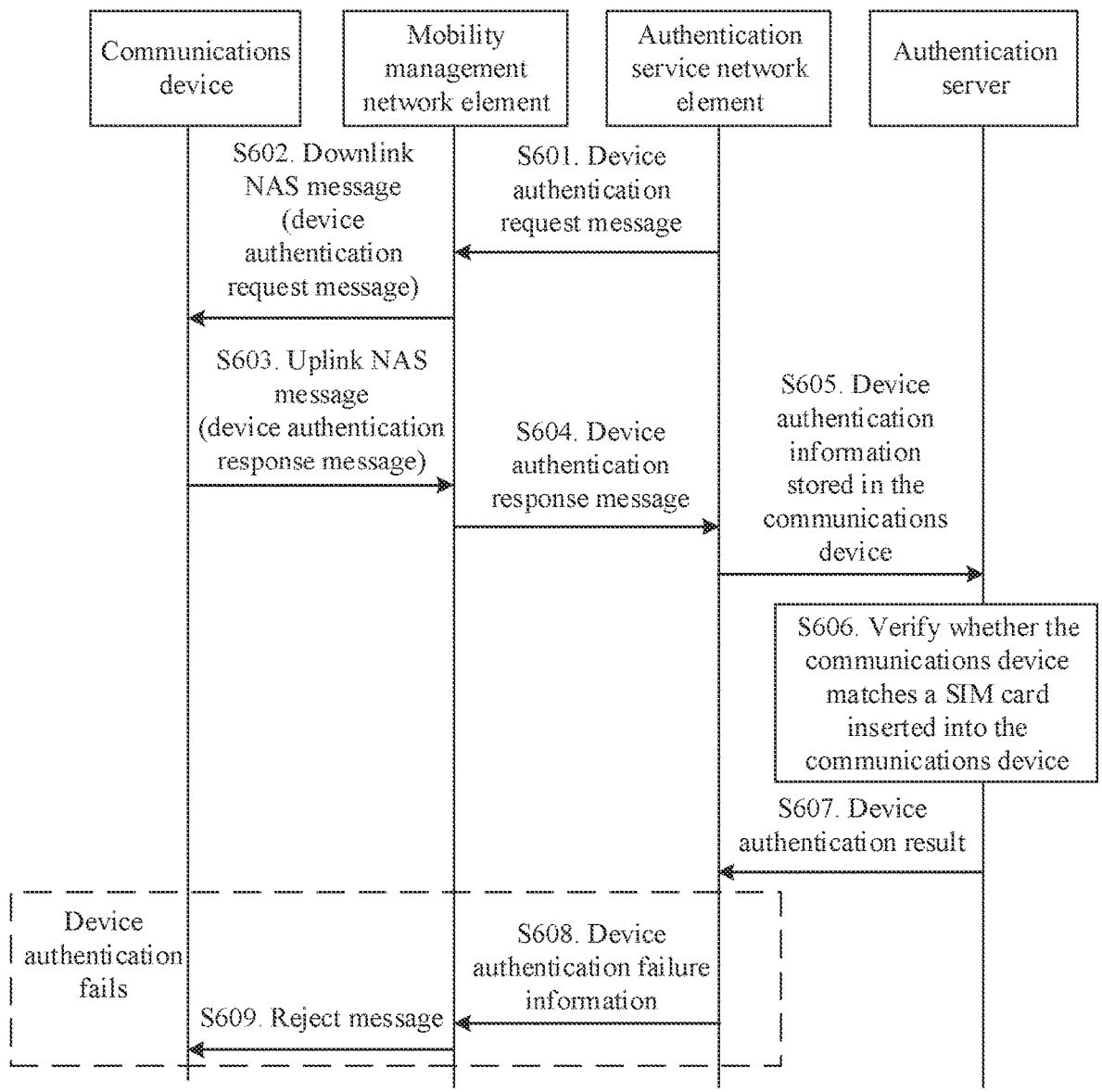
FIG. 14 is a flowchart of another communication method according to an embodiment of this application.

(4) For example, the first network element is an authentication service network element. If no authentication server is integrated into the authentication service network element, as shown in FIG. 14, the device authentication procedure may include the following steps.

S601 to S604 are the same as steps S501 to S504. For specific descriptions of S601 to S604, refer to the embodiment shown in FIG. 13. Details are not described herein.

S605. The authentication service network element sends device authentication information stored in the communications device to an authentication server.

S606 is the same as step S404. For specific descriptions of S606, refer to the embodiment shown in FIG. 12. Details are not described herein.

S607. The authentication server sends a device authentication result to the authentication service network element.

Optionally, as shown in FIG. 14, when device authentication fails, the device authentication procedure may further include steps S608 and S609.

S608 and S609 are the same as steps S506 and S507. For specific descriptions, refer to the embodiment shown in FIG. 13. Details are not described herein.

Figure 15:
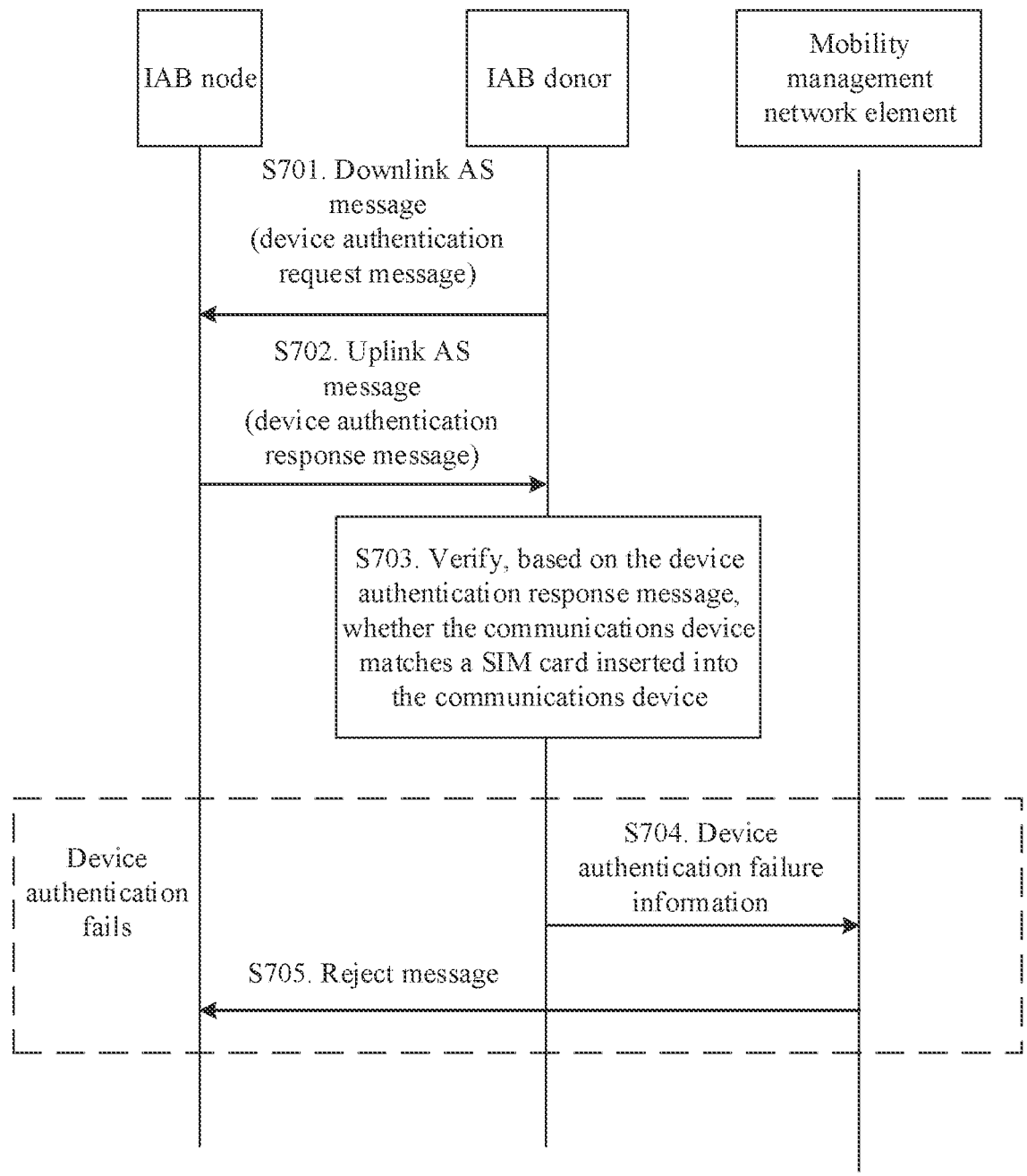
FIG. 15 is a flowchart of another communication method according to an embodiment of this application.

(5) For example, the communications device is an IAB node, and the first network element is an IAB donor. If the authentication server is integrated into the IAB donor, as shown in FIG. 15, the device authentication procedure includes the following steps.

S701. The IAB donor sends a downlink AS message to the IAB node, so that the IAB node receives the downlink AS message from the IAB donor.

In this embodiment of this application, security protection is performed on the downlink AS message based on security context.

Optionally, the downlink AS message is an AS SMC message. In this way, signaling in the AS SMC procedure is reused for the signaling in the device authentication procedure, thereby reducing signaling overheads.

The AS SMC message includes a device authentication request message. For specific descriptions of the device authentication request message, refer to the foregoing descriptions. Details are not described herein.

It should be noted that the AS SMC message is received by an MT of the IAB node.

S702. The IAB node sends an uplink AS message to the IAB donor, so that the IAB donor receives the uplink AS message from the IAB node.

In this embodiment of this application, security protection is performed on the uplink AS message based on the security context.

Optionally, the uplink AS message is an AS SMP message. In this way, signaling in the AS SMC procedure is reused for the signaling in the device authentication procedure, thereby reducing signaling overheads.

The AS SMP message includes a device authentication response message. For specific descriptions of the device authentication response message, refer to the foregoing descriptions. Details are not described herein.

It should be noted that the AS SMP message is received by the MT of the IAB node.

It may be understood that in addition to the uplink AS message and the downlink AS message, in the device authentication procedure, other AS signaling may be further transmitted between the IAB node and the IAB donor, to complete exchange of device authentication-related information. This embodiment of this application is not limited thereto.

S703. The IAB donor verifies, based on the device authentication response message, whether the communications device matches the SIM card inserted into the communications device.

In a possible implementation, the IAB donor verifies whether device authentication information stored in the communications device is consistent with device authentication information corresponding to the user identifier. When the device authentication information stored in the communications device is inconsistent with the device authentication information corresponding to the user identifier, the IAB donor determines that device authentication fails. When the device authentication information stored in the communications device is consistent with the device authentication information corresponding to the user identifier, the IAB donor determines that device authentication succeeds.

Optionally, as shown in FIG. 15, when device authentication fails, the device authentication procedure may further include steps S704 and S705.

S704. The IAB donor sends device authentication failure information to a mobility management network element, so that the mobility management network element receives the device authentication failure information from the IAB donor.

Optionally, the device authentication failure information is carried in an N2 message.

In this embodiment of this application, if device authentication is performed in the registration procedure, the device authentication failure information is used to trigger the mobility management network element to send a registration failure message. If device authentication is performed after the registration procedure ends, the device authentication failure information is used to trigger the mobility management network element to initiate a deregistration procedure. Alternatively, the device authentication failure information is used to trigger the mobility management network element to send a deregistration message.

S705 is the same as step S304. For specific descriptions, refer to the embodiment shown in FIG. 11. Details are not described herein.

Figure 16:
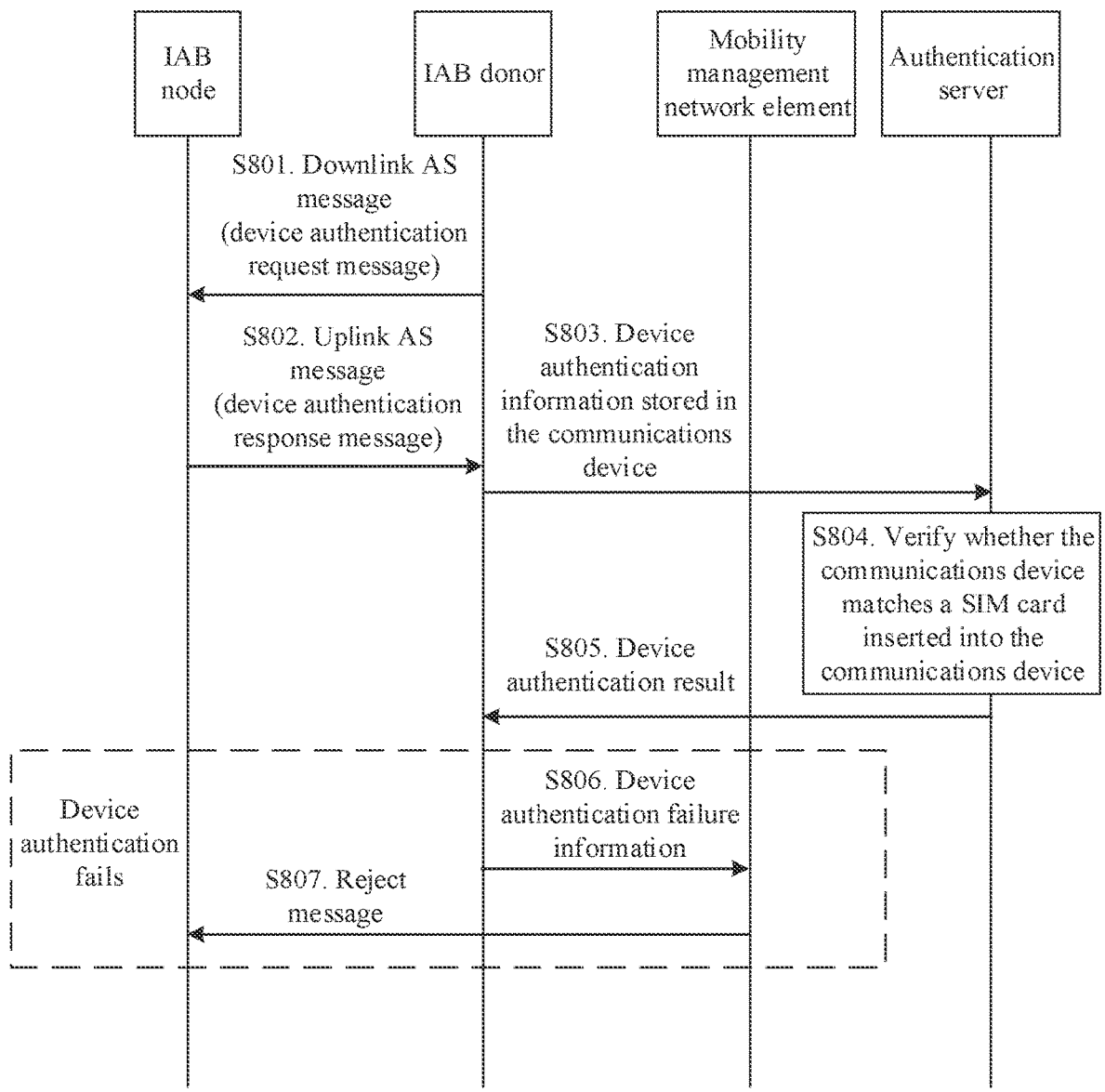
FIG. 16 is a flowchart of another communication method according to an embodiment of this application.

(6) For example, the communications device is an IAB node, and the first network element is an IAB donor. If no authentication server is integrated into the IAB donor, as shown in FIG. 16, the device authentication procedure includes the following steps.

S801 and S802 are the same as steps S701 and S702. For specific descriptions, refer to the embodiment shown in FIG. 15. Details are not described herein.

S803. The IAB donor sends device authentication information stored in the communications device to an authentication server.

S804 is the same as step S404. For specific descriptions, refer to the embodiment shown in FIG. 12.

S805. The authentication server sends a device authentication result to the IAB donor.

Optionally, as shown in FIG. 16, when device authentication fails, the device authentication procedure may further include steps S806 and S807.

S806 and S807 are the same as steps S704 and S705. For specific descriptions, refer to the embodiment shown in FIG. 15. Details are not described herein.

It should be noted that if the communications device is an IAB node and the first network element is an IAB donor, when an IPsec authentication credential is configured for the IAB node, and an IPsec function is enabled for the IAB node, the IAB donor may perform device authentication on the IAB node by selecting an IPsec authentication manner. In this case, the IPsec authentication credential is equivalent to the device authentication credential. For an IPsec authentication procedure, refer to the conventional technology. Details are not described herein. It should be noted that the IAB node performs the IPsec authentication procedure by using a DU.

When device authentication is implemented by using IPsec authentication, no other device authentication manner is required between the IAB donor and IAB node. In this way, the device authentication procedure is implemented by reusing the existing IPsec authentication procedure, thereby reducing signaling overheads.

A specific implementation in which the second network element indicates the first network element to perform device authentication on the communications device is described below.

Figure 17:
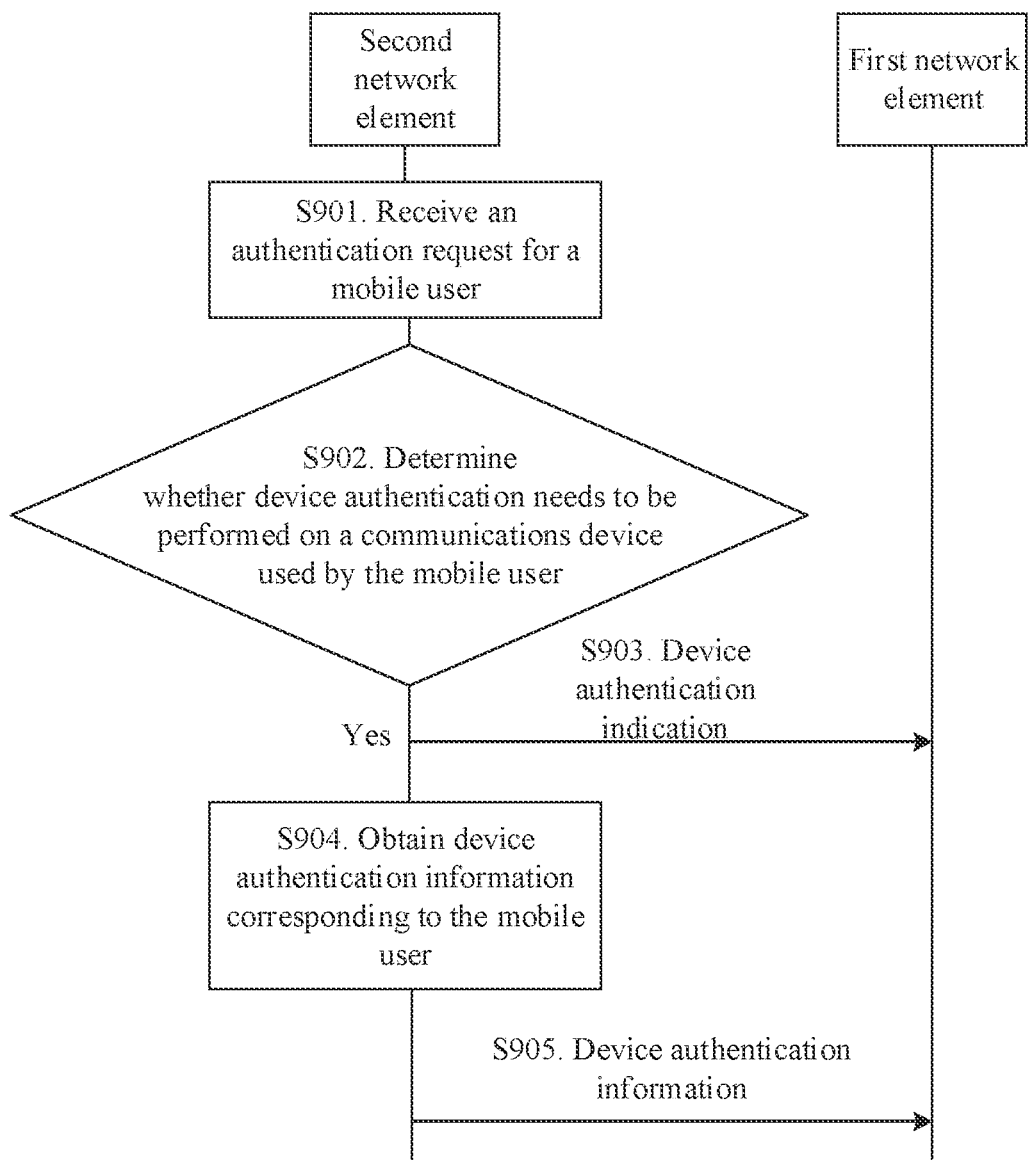
FIG. 17 is a flowchart of another communication method according to an embodiment of this application.

FIG. 17 shows a communication method according to an embodiment of this application. The communication method includes the following steps.

S901. A second network element receives an authentication request for a mobile user.

For example, the second network element may be UDM or an ARPF. This embodiment of this application is not limited thereto.

The authentication request for the mobile user includes a user identifier of the mobile user. For example, the user identifier may be an SUCI or an SUPI.

In an implementation, after a communications device initiates a registration procedure of the mobile user corresponding to a SIM card, a network side needs to authenticate the mobile user corresponding to the SIM card. Based on this, in an authentication procedure of the mobile user, the second network element may receive the authentication request.

S902. The second network element determines whether device authentication needs to be performed on the communications device used by the mobile user.

In this embodiment of this application, the communications device used by the mobile user is a communications device into which the SIM card corresponding to the mobile user is inserted.

It should be noted that step S902 may be performed in a primary authentication procedure, or may be performed after a primary authentication procedure ends.

Optionally, step S902 may use one or more of the following implementations:

(1) The second network element determines that device authentication needs to be performed on any communications device.

(2) The second network element determines whether the SIM card corresponding to the mobile user is bound to a first-type device. When the SIM card corresponding to the mobile user is bound to a first-type device, the second network element determines that device authentication needs to be performed on the communications device used by the mobile user. When the SIM corresponding to the mobile user is not bound to a first-type device, the second network element may determine that no device authentication needs to be performed on the communications device used by the mobile user.

Optionally, that the second network element determines whether the SIM card corresponding to the mobile user is bound to a first-type device may be implemented as follows: The second network element determines whether the user identifier of the mobile user is in a preset list. If the user identifier of the mobile user is in the preset list, it indicates that the SIM card corresponding to the mobile user is bound to a first-type device. On the contrary, if the user identifier of the mobile user is not in the preset list, it indicates that the SIM card corresponding to the mobile user is not bound to a first-type device.

For example, the second network element determines whether the user identifier of the mobile user is in an IAB list. If the user identifier of the mobile user is in the IAB list, it indicates that the SIM card corresponding to the mobile user is bound to an IAB node, in other words, the communications device into which the SIM card is inserted should be an IAB node. If the user identifier of the mobile user is not in the IAB list, it indicates that the SIM card corresponding to the mobile user is not bound to an IAB node, in other words, the communications device into which the SIM card is inserted should not be an IAB node.

It should be noted that the first-type device should use a SIM card bound to the first-type device, and therefore the network side needs to ensure that the first-type device matches a SIM card inserted into the first-type device.

Therefore, when the SIM card corresponding to the mobile user is bound to a first-type device, the network side needs to perform device authentication on the communications device into which the SIM card is currently inserted.

(3) The second network element determines whether the SIM card corresponding to the mobile user is a first-type SIM card. When the SIM card corresponding to the mobile user is a first-type SIM card, the second network element determines that device authentication needs to be performed on the communications device. When the SIM card corresponding to the mobile user is a second-type SIM card, the second network element determines that no device authentication needs to be performed on the communications device.

In a possible specific implementation, the second network element obtains subscription data of the mobile user based on the user identifier of the mobile user. If the subscription data of the mobile user includes first indication information, the second network element determines that device authentication needs to be performed on the communications device. If the subscription data of the mobile user does not include the first indication information, the second network element determines that no device authentication needs to be performed on the communications device. The first indication information is used to indicate that the SIM card corresponding to the mobile user is a first-type SIM card.

It may be understood that when the SIM card corresponding to the mobile user is a first-type SIM card, it indicates that the SIM card corresponding to the mobile user is at a risk of being removed from the communications device by an attacker. Therefore, the network side needs to perform device verification on the communications device into which the SIM card is currently inserted, to ensure that the communications device matches the SIM card inserted into the communications device.

(4) The second network element determines whether IPsec authentication is performed on the communications device by using a stored IPsec authentication credential. If IPsec authentication is performed on the communications device by using the stored IPsec authentication credential, the second network element determines that no device authentication needs to be performed on the communications device. If no IPsec authentication is performed on the communications device, or the communications device does not store the IPsec authentication credential, the second network element determines that no device authentication needs to be performed on the communications device.

In a possible implementation, the second network element obtains IPsec configuration information based on the user identifier of the mobile user. If the IPsec configuration information is used to indicate that an IPsec function is enabled for the communications device, and the communications device prestores the IPsec authentication credential, the second network element may determine that device authentication needs to be performed on the communications device. If the IPsec configuration information is used to indicate that the IPsec function is not enabled for the communications device, or the IPsec configuration information is used to indicate that the communications device does not prestore the IPsec authentication credential, the second network element may determine that device authentication needs to be performed on the communications device.

It may be understood that when IPsec authentication is performed on the communications device by using the stored IPsec authentication credential, if IPsec authentication performed on the communications device succeeds, it indicates that the communications device is trusted. Therefore, the network side no longer needs to perform device authentication on the communications device again. In this way, the second network element may determine that no device authentication needs to be performed on the communications device.

It should be noted that the implementation (4) is applicable to a scenario in which the communications device is an IAB node.

The implementation (1) to the implementation (4) are merely examples. This embodiment of this application is not limited thereto.

In this embodiment of this application, when the second network element determines that device authentication needs to be performed on the communications device, the second network element performs the following step S903.

S903. The second network element sends a device authentication indication to a first network element, so that the first network element receives the device authentication indication.

The device authentication indication is used to indicate that device authentication needs to be performed on the communications device.

Based on the technical solution shown in FIG. 17, after the communications device initiates the registration procedure of the mobile user corresponding to the SIM card, the second network element determines, based on the received authentication request for the mobile user, whether device authentication needs to be performed on the communications device used by the mobile user. In addition, when device authentication needs to be performed on the communications device, the second network element sends the device authentication indication to the first network element, so that the first network element performs device authentication on the communications devices, to verify whether the communications device matches the SIM card inserted into the communications device, so as to prevent an unauthorized device from accessing a communications network by using a SIM card of an authorized device.

Optionally, as shown in FIG. 17, when the second network element prestores a device authentication credential, the communication method may further include steps S904 and S905.

S904. The second network element obtains device authentication information corresponding to the mobile user.

In a possible implementation, the second network element determines, based on the user identifier and a prestored binding relationship between a user identifier and a device authentication credential, a device authentication credential bound to the user identifier. Then, the second network element may determine, based on the device authentication credential, the device authentication information corresponding to the mobile user.

The device authentication information may be a device authentication credential. Alternatively, the device authentication information may be an authentication parameter generated based on a device authentication credential.

For example, for the binding relationship between the user identifier and the device authentication credential, refer to Table 1. Descriptions are provided by using an example with reference to Table 1. If the user identifier is an SUIP #1, the second network element may determine that the corresponding device authentication credential is a device authentication credential #1.

TABLE 1

| User identifier | Device authentication credential |
|---|---|
| SUIP #1 | Device authentication credential #1 |
| SUIP #2 | Device authentication credential #2 |
| SUIP #3 | Device authentication credential #3 |
| ... | ... |

S905. The second network element sends the device authentication information to the first network element based on the device authentication credential.

It may be understood that the device authentication information and the device authentication indication may be carried in same signaling. Alternatively, the device authentication information and the device authentication indication may be carried in different signaling. This embodiment of this application is not limited thereto.

Based on steps S904 and S905, the first network element may obtain the device authentication information, so that the first network element performs device authentication with the communications device.

It may be understood that if the second network element does not store the device authentication credential, the second network element may not perform steps S904 and S905.

Figure 18:
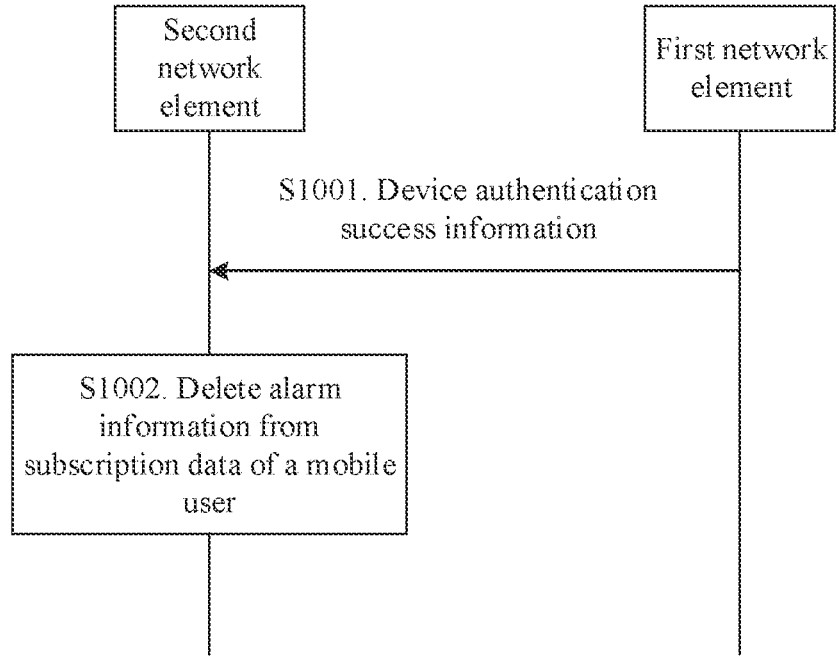
FIG. 18 is a flowchart of another communication method according to an embodiment of this application.

In a possible design, after the first network element performs device authentication on the communications device, if device authentication performed on the communications device succeeds, FIG. 18 shows a communication method according to an embodiment of this application. The communication method includes the following steps S1001 and S1002.

S1001. The first network element sends device authentication success information to the second network element, so that the second network element receives the device authentication success information from the first network element.

For example, the first network element is an AMF or an AUSF, and the second network element is a UDM. The device authentication success information may be carried in an Nudm service interface message. This embodiment of this application is not limited thereto.

S1002. The second network element deletes alarm information from the subscription data of the mobile user.

It may be understood that step S1002 is optional. For example, when the subscription data of the mobile user does not include the alarm information, the second network element may not perform step S1002.

Based on steps S1001 and S1002, when device authentication performed on the communications device succeeds, the second network element deletes the alarm information from the subscription data of the mobile user, to avoid a case in which device authentication needs to be performed on the communications device again when the communications device accesses the communication network next time. In this way, an access procedure of the communications device is simplified, and signaling overheads are reduced.

Figure 19:
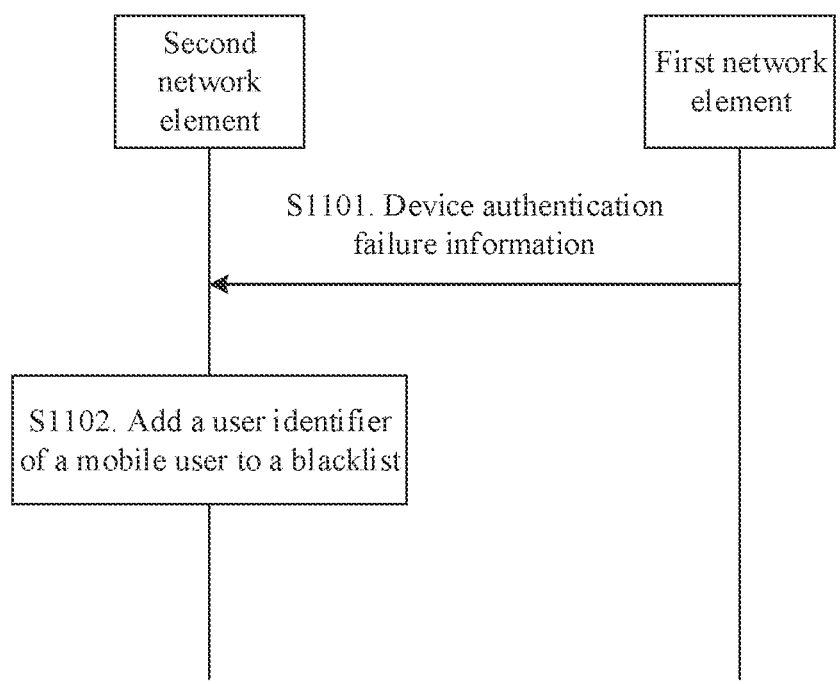
FIG. 19 is a flowchart of another communication method according to an embodiment of this application.

In a possible design, after the first network element performs device authentication on the communications device, if device authentication performed on the communications device fails, FIG. 19 shows a communication method according to an embodiment of this application. The communication method includes the following steps S1101 and S1102. Step S1102 is optional.

S1101. The first network element sends device authentication failure information to the second network element, so that the second network element receives the device authentication failure information.

For example, the first network element is an AMF or an AUSF, and the second network element is a UDM. The device authentication failure information may be carried in an Nudm service interface message. This embodiment of this application is not limited thereto.

S1102. The second network element adds the user identifier of the mobile user to a blacklist.

The blacklist is used to record a user identifier of at least one mobile user forbidden to access the communications network.

Based on steps S1101 and S1102, if device authentication performed on the communications device fails, it indicates that the communications device does not match the SIM card inserted into the communications device, and therefore it indicates that the communications device may be an unauthorized device, and the SIM card falls into hands of an attacker. Based on this, the second network element adds the user identifier corresponding to the SIM card to the blacklist, to forbid use of the SIM card, so as to prevent an unauthorized device from accessing the communications network by using the SIM card, and ensure security of the communications network.

The communication method shown in FIG. 17 is described below with reference to a primary authentication procedure.

For example, the second network element is a UDM. The UDM may determine, in the primary authentication procedure, whether device authentication needs to be performed on the communications device. In addition, when the UDM determines that device authentication needs to be performed on the communications device, the UDM sends the device authentication indication to the first network element by reusing signaling in the primary authentication procedure.

Figure 20:
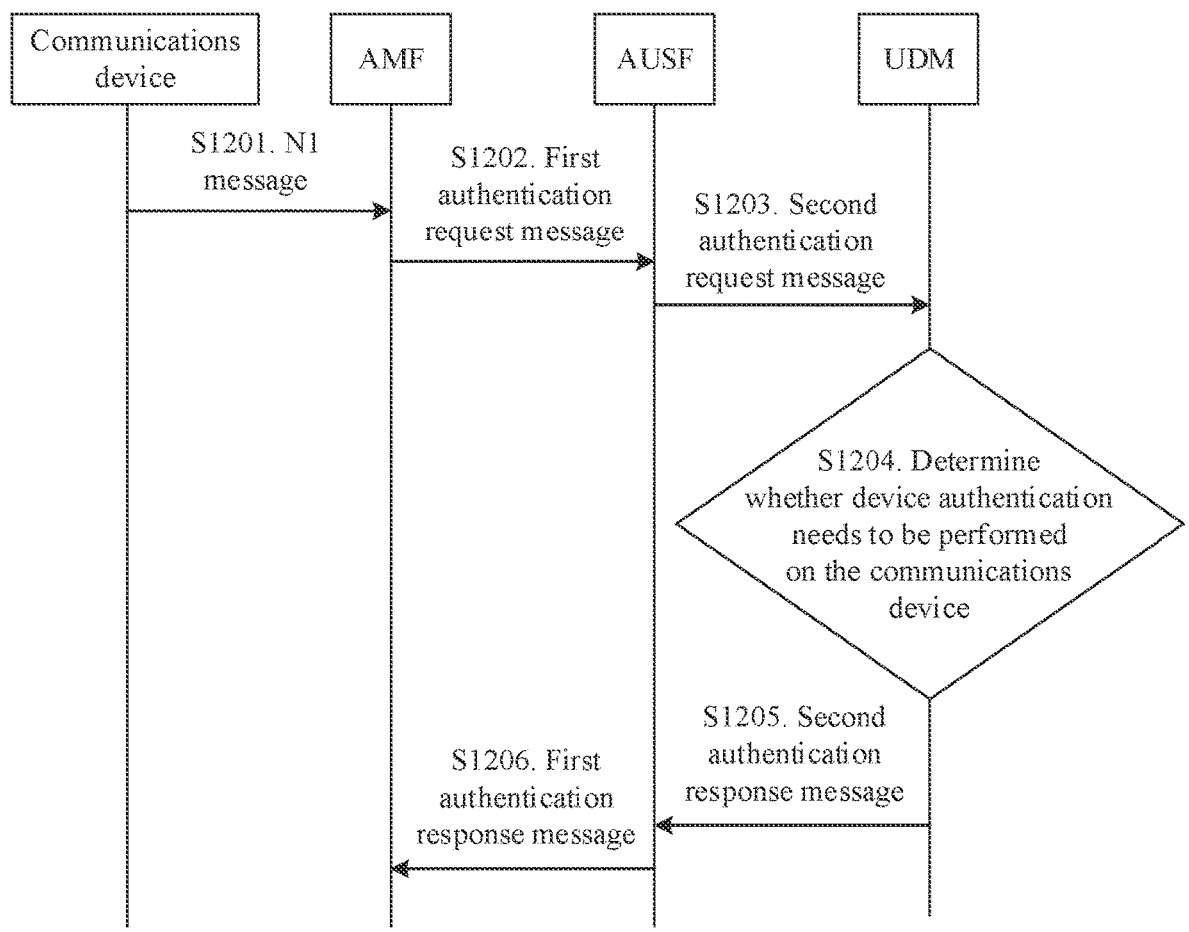
FIG. 20 is a flowchart of another communication method according to an embodiment of this application.

FIG. 20 shows a communication method according to an embodiment of this application. The communication method includes the following steps.

S1201. A communications device sends an N1 message to an AMF, so that the AMF receives the N1 message from the communications device.

The N1 message includes a user identifier. For example, the N1 message includes an SUCI or a 5G-GUTI.

S1202. The AMF sends a first authentication request message to an AUSF, so that the AUSF receives the first authentication request message from the AMF.

The first authentication request message includes an SUCI/SUPI and a serving network name (server network name, SN name).

For example, the first authentication request message may be an Nausf_UEAuthentication_Authenticate request.

In an implementation, the AMF determines the AUSF and a UDM based on an SN name in the 5G-GUTI or a route identifier in the SUCI, and then the AMF sends the first authentication request message to the AUSF.

S1203. The AUSF sends a second authentication request message to the UDM, so that the UDM receives the second authentication request message from the ASUF.

The second authentication request message includes an SUCI/SUPI and an SN name.

For example, the second authentication request message may be an Nudm_UEAuthentication_Get request.

In this embodiment of this application, the second authentication request message is equivalent to the authentication request for the mobile user in FIG. 17.

S1204. The UDM determines whether device authentication needs to be performed on the communications device.

For specific descriptions of step S1204, refer to the embodiment shown in FIG. 17. Details are not described herein.

S1205. The UDM sends a second authentication response message to the AUSF, so that the AUSF receives the second authentication response message.

The second authentication response message is used to respond to the second authentication request message. The second authentication response message includes an authentication vector and an SUPI.

For example, when an EAP-AKA' solution is used for primary authentication, the authentication vector may be EAP-AKA' AV. When a 5G AKA solution is used for primary authentication, the authentication vector may be 5G HE AV.

For example, the second authentication response message may be an Nudm_UEAuthentication_Get response.

In this embodiment of this application, when the UDM determines that device authentication needs to be performed on the communications device, the second authentication response message further includes a device authentication indication. When the UDM determines that no device authentication needs to be performed on the communications device, the second authentication response message does not include the device authentication indication.

S1206. The AUSF sends a first authentication response message to the AMF, so that the AMF receives the first authentication response message from the AUSF.

The first authentication response message is used to respond to the first authentication request message.

The first authentication response message may include a device authentication indication.

For example, when the EAP-AKA' solution is used for primary authentication, the first authentication response message further includes EAP Request/-AKA'-Challenge. When the 5G AKA solution is used for primary authentication, the first authentication response message may include 5G SE AV.

For example, the first authentication response message is an Nausf_UEAuthentication_Authenticate response.

In this embodiment of this application, if the first network element is an ASUF, regardless of whether device authentication needs to be performed on the communications device, the first authentication response message does not include the device authentication indication.

In this embodiment of this application, if the first network element is an AMF, when the second authentication response message includes the device authentication indication, the first authentication response message also includes the device authentication indication; and when the second authentication response message does not include the device authentication indication, the first authentication response message does not include the device authentication indication.

Based on the technical solution shown in FIG. 20, in the primary authentication procedure, the UDM may send the device authentication indication to the AMF/AUSF by reusing signaling in the primary authentication procedure, thereby reducing signaling overheads.

It should be noted that FIG. 20 merely describes some steps in the primary authentication procedure, and the primary authentication procedure further includes other steps. Details are not described herein in this embodiment of this application.

The technical solution shown in FIG. 10 and the technical solution shown in FIG. 17 are described below with reference to a specific embodiment.

Figure 21:
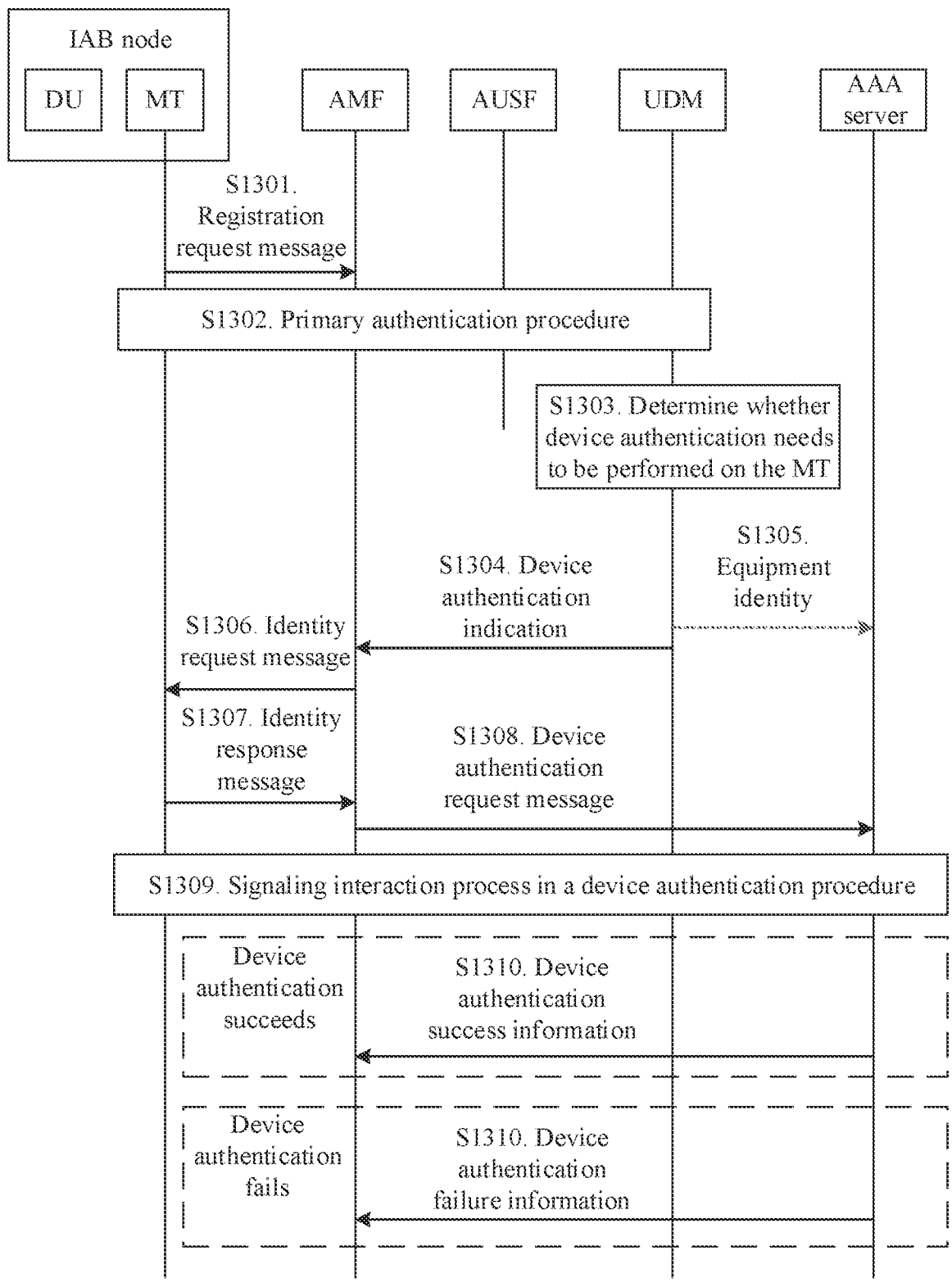
FIG. 21 is a flowchart of another communication method according to an embodiment of this application.

FIG. 21 shows a communication method according to an embodiment of this application. The communication method includes the following steps.

S1301. An MT of an IAB node sends a registration request message to an AMF.

S1302. The MT of the IAB node performs a primary authentication procedure with a network side.

S1303. After the primary authentication procedure ends, a UDM determines whether device authentication needs to be performed on the IAB node.

For step S1303, refer to the embodiment shown in FIG. 17. Details are not described herein.

S1304. When determining that device authentication needs to be performed on the IAB node, the UDM sends a device authentication indication to the AMF.

The device authentication indication may be carried in an Nudm interface message, for example, Nudm_SDM_info.

S1305. When determining that device authentication needs to be performed on the IAB node, the UDM sends an equipment identity to an AAA server.

The equipment identity is bound to a user identifier stored in a SIM card inserted into the MT.

It should be noted that in the primary authentication procedure, the UDM may obtain the user identifier stored in the SIM card inserted into the MT. In addition, the UDM stores a binding relationship between a user identifier and an equipment identity, and therefore the UDM may determine the corresponding equipment identity based on the user identifier stored in the SIM card inserted into the MT.

After receiving the equipment identity, the AAA server may determine a corresponding device authentication credential based on the equipment identity for use in a subsequent device authentication procedure.

Optionally, the AAA server may be integrated into a core network element.

S1306. The AMF sends an identity request message (for example, an ID request) to the MT of the IAB node.

The identity request message is used to request device authentication information of the MT.

S1307. The MT of the IAB node sends an identity response message (for example, an ID response) to the AMF.

The identity response message includes the device authentication information of the MT.

S1308. The AMF sends a device authentication request message to the AAA server.

The device authentication request message includes device authentication information.

For example, the device authentication request message may be a device authentication request.

S1309. The AAA server performs a signaling interaction process in the device authentication procedure with the MT of the IAB node.

It may be understood that step S1309 is optional. For signaling in the signaling interaction process, refer to the conventional technology. Details are not described herein.

In this embodiment of this application, the AAA server determines, based on the device authentication information, a device authentication credential stored in the MT, and then the AAA server checks whether the device authentication credential corresponding to the equipment identity is consistent with the device authentication credential stored in the MT, to determine a device authentication result.

When device authentication succeeds, the AAA server performs the following step S1310. When device authentication fails, the AAA server performs the following step S1311.

S1310. The AAA server sends device authentication success information to the AMF.

It may be understood that after the AMF receives the device authentication success information, the AMF continues to perform another step in a registration procedure.

S1311. The AAA server sends device authentication failure information to the AMF device.

It may be understood that after the AMF receives the device authentication failure information, the AMF sends a registration failure message to the MT of the IAB node, to prevent the IAB node from accessing a communication network.

The foregoing mainly describes the solutions provided in the embodiments of this application from a perspective of interaction between network elements. It may be understood that to implement the foregoing function, each network element such as the communications device, the data management network element, or the authentication network element includes a corresponding hardware structure or a software module for performing each function, or a combination thereof. A person skilled in the art should easily be aware that units and algorithm steps in the examples described with reference to the embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the network device and the terminal may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that in the embodiments of this application, division into the modules is an example and is merely logical function division, and may be other division during actual implementation. An example in which each function module is obtained through division based on each corresponding function is used below for description.

Figure 22:
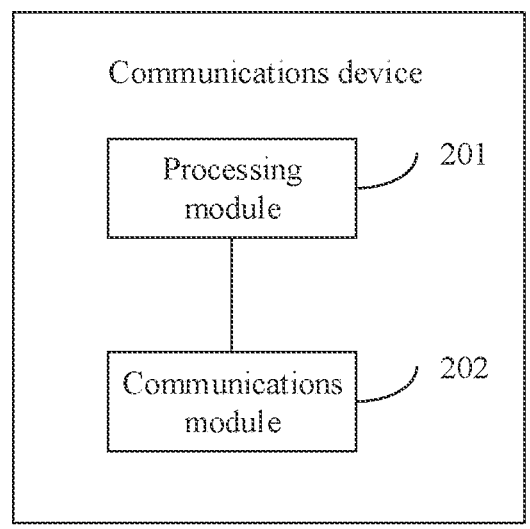
FIG. 22 is a schematic diagram of a structure of a communications device according to an embodiment of this application.

FIG. 22 is a schematic diagram of a structure of a communications device according to an embodiment of this application. The communications device includes a processing module 201 and a communications module 202. The processing module 201 is configured to perform steps S101 and S103 in FIG. 7, step S202 in FIG. 10, and the like. The communications module 202 is configured to perform step S102 in FIG. 7, steps S102a and S1031a in FIG. 8, steps S102b and S1031b in FIG. 9, step S201 in FIG. 10, steps S301, S302, and S304 in FIG. 11, steps S401, S402, and S406 in FIG. 12, steps S502, S503, and S507 in FIG. 13, steps S602, S603, and S609 in FIG. 14, steps S701, S702, and S705 in FIG. 15, steps S801, S802, and S807 in FIG. 16, and the like.

In an example, with reference to the communications apparatus shown in FIG. 6, the processing module 201 in FIG. 22 may be implemented by the processor 101 in FIG. 6, and the communications module 202 in FIG. 22 may be implemented by the communications interface 104 in FIG. 6. This is not limited in this embodiment of this application.

Figure 23:
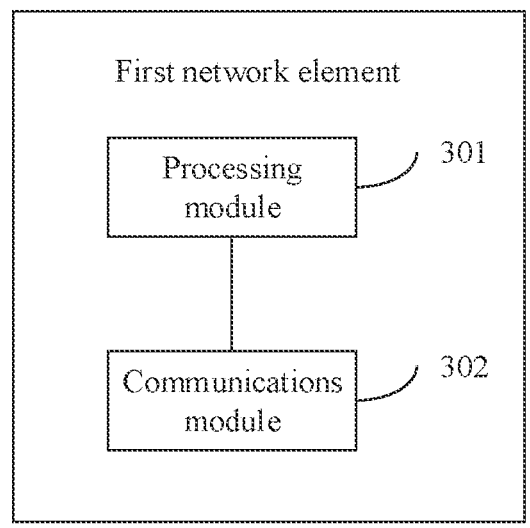
FIG. 23 is a schematic diagram of a structure of a first network element according to an embodiment of this application.

FIG. 23 is a schematic diagram of a structure of a first network element according to an embodiment of this application. The first network element includes a processing module 301 and a communications module 302. The processing module 301 is configured to perform step S202 in FIG. 10, step S303 in FIG. 11, step S505 in FIG. 13, step S703 in FIG. 15, and the like. The communications module 302 is configured to perform step S203 or S204 in FIG. 10, steps S301, S302, and S304 in FIG. 11, steps S401, S402, S403, S405, and S406 in FIG. 12, steps S501, S504, and S506 in FIG. 13, steps S601, S604, S605, S607, and S608 in FIG. 14, steps S701, S702, and S704 in FIG. 15, steps S801, S802, S803, S805, and S806 in FIG. 16, steps S903 and S904 in FIG. 17, step S1001 in FIG. 18, step S1101 in FIG. 19, and the like.

In an example, with reference to the communications apparatus shown in FIG. 6, the processing module 301 in FIG. 23 may be implemented by the processor 101 in FIG. 6, and the communications module 302 in FIG. 23 may be implemented by the communications interface 104 in FIG. 6. This is not limited in this embodiment of this application.

Figure 24:
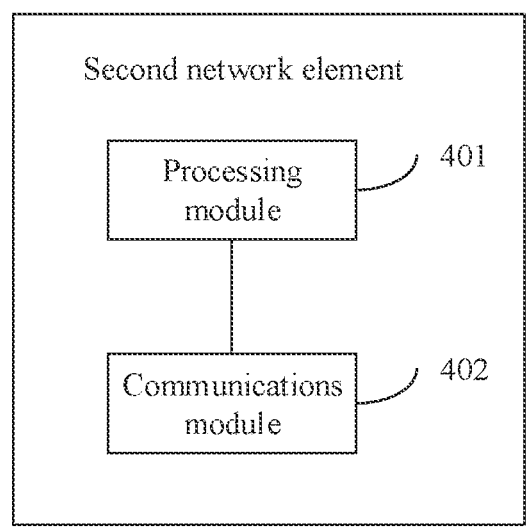
FIG. 24 is a schematic diagram of a structure of a second network element according to an embodiment of this application.

FIG. 24 is a schematic diagram of a structure of a second network element according to an embodiment of this application. The second network element includes a processing module 401 and a communications module 402. The processing module 401 is configured to perform steps S902 and S904 in FIG. 17, step S1002 in FIG. 18, step S1102 in FIG. 19, and the like. The communications module 402 is configured to perform steps S903 and S904 in FIG. 17, step S1001 in FIG. 18, step S1101 in FIG. 19, and the like.

In an example, with reference to the communications apparatus shown in FIG. 6, the processing module 401 in FIG. 24 may be implemented by the processor 101 in FIG. 6, and the communications module 402 in FIG. 24 may be implemented by the communications interface 104 in FIG. 6. This is not limited in this embodiment of this application.

An embodiment of this application further provides a computer-readable storage medium. The computer-readable storage medium stores computer instructions. When the computer-readable storage medium is run on a computer, the computer is enabled to perform the method provided in the embodiments of this application.

An embodiment of this application further provides a computer program product that includes computer instructions. When the computer program product is runs on a computer, the computer is enabled to perform the method provided in the embodiments of this application.

An embodiment of this application provides a chip. The chip includes a processor. When the processor executes instructions, the chip is enabled to perform the method provided in the embodiments of this application.

It should be understood that the computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

With descriptions of the foregoing implementations, a person skilled in the art may clearly understand that, for the purpose of convenient and brief description, division into the foregoing function modules is used as an example for description. In actual application, the foregoing functions can be allocated to different function modules and implemented based on a requirement. That is, an inner structure of an apparatus is divided into different function modules to implement all or some of the functions described above.

It should be understood that in the several embodiments provided in this application, the disclosed apparatuses and methods may be implemented in other manners. For example, the described apparatus embodiments are merely examples. For example, division into the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate components may or may not be physically separate, and components displayed as units may be one or more physical units, in other words, may be located in one place, or may be distributed on a plurality of different places. Some or all of the units may be selected based on actual requirements to achieve the objectives of the solutions in the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in the embodiments of this application.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communications system, comprising a communications device and a network device, wherein a subscriber identification module (SIM) card is installed in the communications device, wherein:
the communications device is configured to:
  determine that the SIM card is removed;
  send alarm information to the network device, wherein the alarm information indicates that the SIM card in the communications device is removed, and wherein security protection is performed on the alarm information based on security context stored in the communications device; and
  delete the security context, wherein deleting the security context comprises:
    receiving a security-protected acknowledgment message from the network device; and
    deleting the security context after performing security deprotection on the security-protected acknowledgment message by using the security context; and
the network device is configured to:
  receive the alarm information; and
  store the alarm information.

2. The communications system according to claim 1, wherein determining that the SIM card is removed comprises:
determining that a connection to the SIM card is interrupted; or
determining that information cannot be read from the SIM card.

3. The communications system according to claim 1, wherein:
the network device is a mobility management network element;
sending the alarm information to the network device comprises sending, to the mobility management network element, non-access stratum (NAS) signaling on which NAS security protection is performed based on the security context, wherein the NAS signaling comprises the alarm information; and
receiving the alarm information comprises receiving the NAS signaling.

4. The communications system according to claim 3, wherein
the security-protected acknowledgment message comprises a security-protected NAS acknowledgment message from the mobility management network element.

5. The communications system according to claim 1, wherein:
the network device is an access network device;
sending the alarm information to the network device comprises sending, to the access network device, access stratum (AS) signaling on which AS security protection is performed based on the security context, wherein the AS signaling comprises the alarm information; and
receiving the alarm information comprises receiving the AS signaling.

6. The communications system according to claim 5, wherein
the security-protected acknowledgment message comprises a security-protected AS acknowledgment message from the access network device.

7. The communications system according to claim 1, wherein deleting the security context comprises:
deleting the security context after a configured timer expires, wherein the configured timer starts timing after the communications device sends the alarm information, or the configured timer starts timing after the communications device determines that the SIM card is removed.

8. A communication method, wherein the method is applied to a communications device, wherein a subscriber identification module (SIM) card is installed in the communications device, and wherein the method comprises:

determining, by the communications device, that the SIM card is removed;

sending, by the communications device, alarm information to a network device, wherein the alarm information indicates that the SIM card in the communications device is removed, and wherein security protection is performed on the alarm information based on security context stored in the communications device; and deleting, by the communications device, the security context, wherein deleting the security context comprises:

receiving, by the communications device, a security-protected acknowledgment message from the network device; and deleting, by the communications device, the security context after performing security deprotection on the security-protected acknowledgment message by using the security context.

9. The communication method according to claim 8, wherein the determining, by the communications device, that the SIM card is removed comprises:

determining, by the communications device, that a connection to the SIM card is interrupted; or determining, by the communications device, that information cannot be read from the SIM card.

10. The communication method according to claim 8, wherein:

the network device is a mobility management network element; and the sending, by the communications device, alarm information to a network device comprises sending, by the communications device to the mobility management network element, non-access stratum (NAS) signaling on which NAS security protection is performed based on the security context, wherein the NAS signaling comprises the alarm information.

11. The communication method according to claim 10, wherein the security-protected acknowledgment message comprises a security-protected NAS acknowledgment message from the mobility management network element.

12. The communication method according to claim 8, wherein:

the network device is an access network device; and the sending, by the communications device, alarm information to a network device comprises sending, by the communications device to the access network device, access stratum (AS) signaling on which AS security protection is performed based on the security context, wherein the AS signaling comprises the alarm information.

13. The communication method according to claim 12, wherein the security-protected acknowledgment message comprises a security-protected AS acknowledgment message from the access network device.

14. The communication method according to claim 8, wherein the deleting, by the communications device, the security context comprises:

deleting, by the communications device, the security context after a configured timer expires, wherein the configured timer starts timing after the communications device sends the alarm information, or the configured timer starts timing after the communications device determines that the SIM card is removed.

15. A communications apparatus in which a subscriber identification module (SIM) card is installed, comprising:

at least one processor; and a memory coupled to the at least one processor and having program instructions stored thereon which, when executed by the at least one processor, cause the communications apparatus to:

determine that the SIM card is removed;

send alarm information to a network device, wherein the alarm information indicates that the SIM card in the communications apparatus is removed, and wherein security protection is performed on the alarm information based on security context stored in the communications apparatus; and delete the security context, wherein deleting the security context comprises:

receiving a security-protected acknowledgment message from the network device; and deleting the security context after performing security deprotection on the security-protected acknowledgment message by using the security context.

16. The communications apparatus according to claim 15, wherein the instructions, when executed by the at least one processor, further cause the apparatus to:

determine that a connection to the SIM card is interrupted; or determine that information cannot be read from the SIM card.

17. The communications apparatus according to claim 15, wherein the network device is a mobility management network element, and wherein the instructions, when executed by the at least one processor, further cause the apparatus to:

send, to the mobility management network element, non-access stratum (NAS) signaling on which NAS security protection is performed based on the security context, wherein the NAS signaling comprises the alarm information.

18. The communications apparatus according to claim 17, wherein the security-protected acknowledgment message comprises a security-protected NAS acknowledgment message from the mobility management network element.

19. The communications apparatus according to claim 15, wherein the network device is an access network device, and wherein the instructions, when executed by the at least one processor, further cause the apparatus to:

send, to the access network device, access stratum (AS) signaling on which AS security protection is performed based on the security context, wherein the AS signaling comprises the alarm information.

20. The communications apparatus according to claim 15, wherein the instructions, when executed by the at least one processor, further cause the apparatus to:

delete the security context after a configured timer expires, wherein the configured timer starts timing after the communications apparatus sends the alarm information, or the configured timer starts timing after the communications apparatus determines that the SIM card is removed.

* * * * *